US006839714B2

(12) United States Patent
Wheeler et al.

(10) Patent No.: US 6,839,714 B2
(45) Date of Patent: Jan. 4, 2005

(54) SYSTEM AND METHOD FOR COMPARING HETEROGENEOUS DATA SOURCES

(75) Inventors: David B. Wheeler, Austin, TX (US); John R. Ripley, Round Rock, TX (US); Steven C. Wotring, Austin, TX (US)

(73) Assignee: Infoglide Corporation, Austin, TX (US)

( * ) Notice: Subject to any disclaimer, the term of this patent is extended or adjusted under 35 U.S.C. 154(b) by 335 days.

(21) Appl. No.: 09/682,207

(22) Filed: Aug. 6, 2001

(65) Prior Publication Data

US 2002/0055932 A1 May 9, 2002

Related U.S. Application Data

(60) Provisional application No. 60/223,449, filed on Aug. 4, 2000.

(51) Int. Cl.[7] ............................................... G06F 17/30
(52) U.S. Cl. ..................... 707/102; 707/100; 707/101; 707/103 R; 707/104.1
(58) Field of Search ...................... 707/10, 5, 6, 103 R, 707/102, 101, 104.1, 100; 706/12

(56) References Cited

U.S. PATENT DOCUMENTS

| | | | | |
|---|---|---|---|---|
| 5,297,280 A | * | 3/1994 | Potts et al. .................... | 707/5 |
| 5,897,627 A | * | 4/1999 | Leivian et al. ................ | 706/12 |
| 6,161,107 A | * | 12/2000 | Stern ........................ | 707/104.1 |
| 6,334,129 B1 | * | 12/2001 | Kiyoki et al. .................. | 707/5 |
| 6,374,252 B1 | * | 4/2002 | Althoff et al. .............. | 707/102 |
| 6,578,031 B1 | * | 6/2003 | Washizawa .................... | 707/6 |
| 6,618,727 B1 | * | 9/2003 | Wheeler et al. .............. | 707/10 |

FOREIGN PATENT DOCUMENTS

| | | | | |
|---|---|---|---|---|
| EP | 0204994 A2 | * | 12/1986 | ........... G06F/15/40 |
| EP | 0601550 A2 | * | 6/1994 | ......... G06F/15/403 |
| WO | WO99/23584 | * | 5/1999 | ........... G06F/17/30 |

* cited by examiner

*Primary Examiner*—Frantz Coby
(74) *Attorney, Agent, or Firm*—Taylor Russell & Russell, P.C.

(57) ABSTRACT

The present invention is a computer-implemented system and method that allows data in different databases to be shared without requiring the data to be remodeled to fit an existing data convention. The invention allows the comparison of two database structures, and facilitates the searching of information from one database to other databases, or from an external set of search criterion against a plurality of databases. The invention allows information to be exchanged from heterogeneous data sources, or database query sources without having to alter the structure of the data sources that are being searched. A number of techniques may be used to do this comparison and facilitate the cross database searching. Tree comparison methods, user defined mapping methods, the use of similarity comparisons to determine similar database structures and data are used to facilitate the cross database searching.

28 Claims, 22 Drawing Sheets

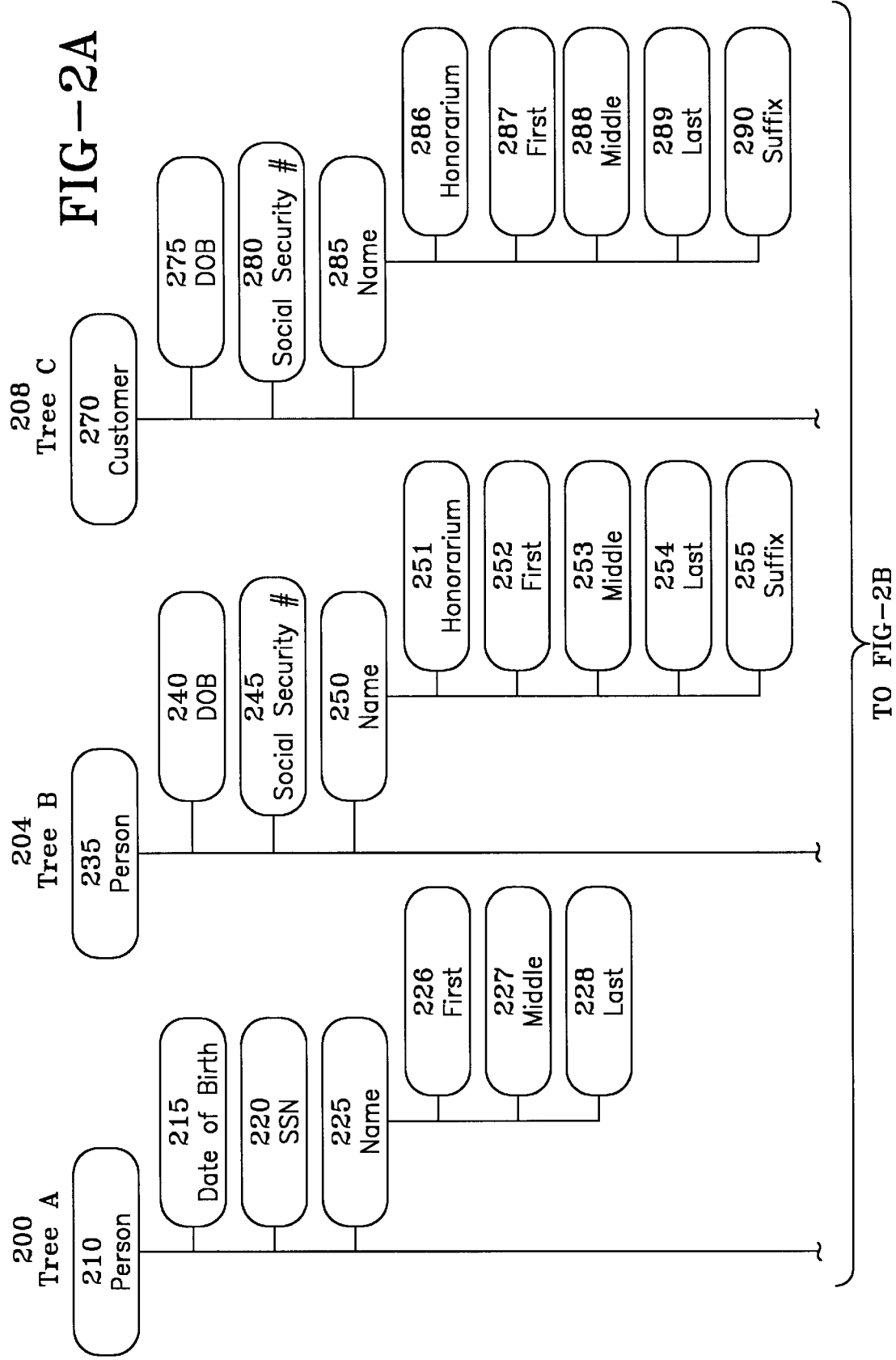

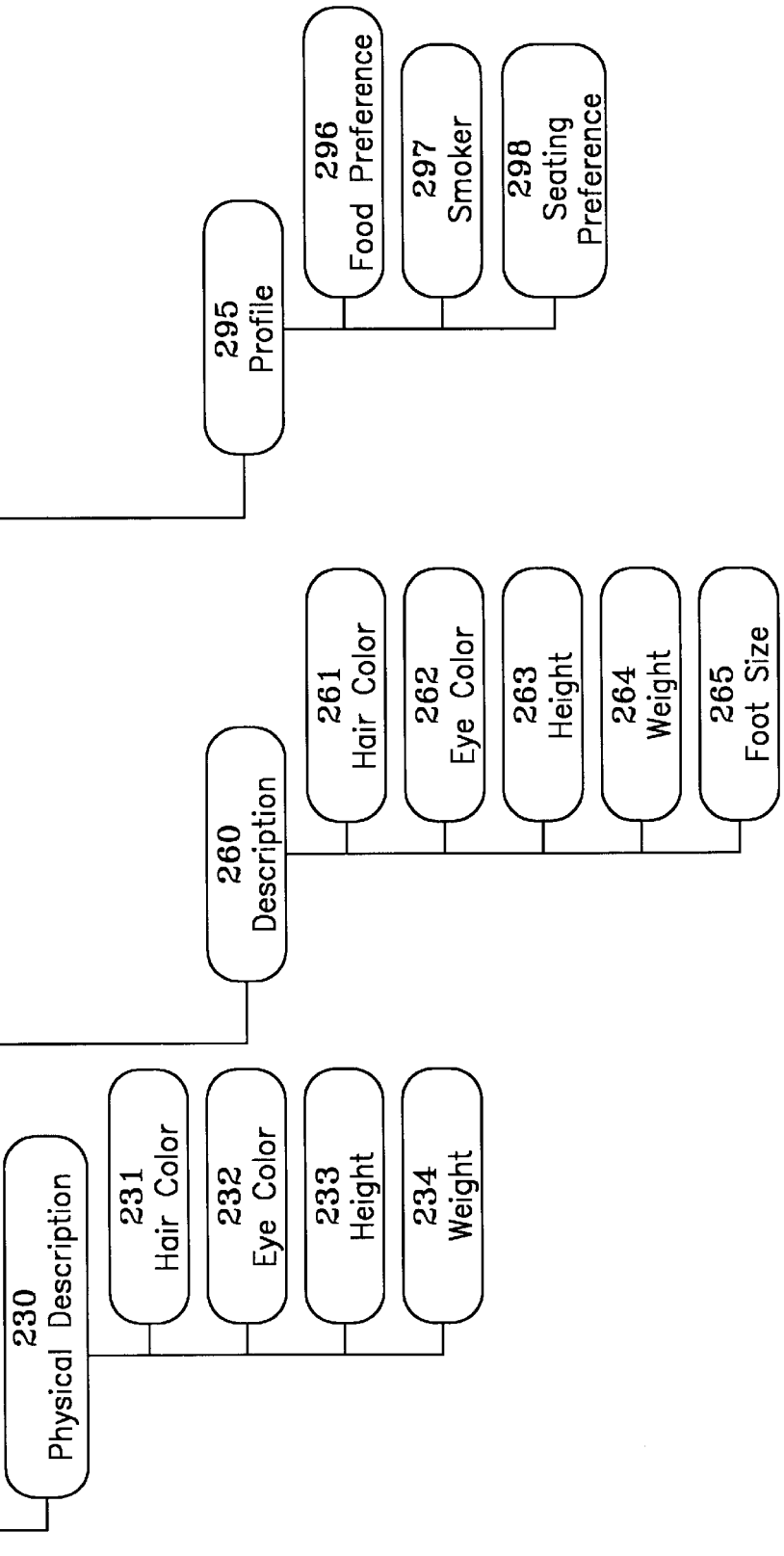

| Comparison Type A | Comparison Type B | Comparison Type C | ... Comparison Type N |
|---|---|---|---|
| Comparison Method 1 | Comparison Method 1 | Comparison Method 1 | Comparison Method 1 |
| Comparison Method 1 | Comparison Method 2 | Comparison Method 3 | Comparison Method 4 |
| Comparison Method 2 | Comparison Method 2 | Comparison Method 3 | Comparison Method 2 |
| Comparison Method 2 | Comparison Method 1 | Comparison Method 3 | Comparison Method 4 |
| Comparison Method 3 | Comparison Method 3 | Comparison Method 3 | Comparison Method 3 |
| Comparison Method 3 | Comparison Method 1 | Comparison Method 2 | Comparison Method 4 |
| Comparison Method 4 | Comparison Method 4 | Comparison Method 2 | Comparison Method 4 |
| Comparison Method 4 | Comparison Method 1 | Comparison Method 2 | Comparison Method 3 |

601 — (header row)
605, 610, 615, 620, 625, 630, 635, 640

XML Structure – Document A

```
<Person>
    <Date_of_Birth Datatype="DOB" Description="Date of Birth"/>
    <SSN Datatype="SSN" Description="SSN"/>
    <Name Datatype="Name" Description="Name">
            <First Datatype="First" Description="First"/>
            <Middle Datatype="Middle" Description="Middle"/>
            <Last Datatype="Last" Description="Last"/>
    </Name>
    <Physical_Description Datatype="Description" Description="Physical Description">
          <Hair_Color Datatype="Hair_Color" Description="Hair Color"/>
          <Eye_Color Datatype="Eye_Color" Description="Eye Color"/>
          <Height Datatype="Height" Description="Height"/>
          <Weight Datatype="Weight" Description="Weight"/>
    </Physical_Description>
</Person>
```

700

XML Structure – Document B

```
<Person>
    <DOB Datatype="DOB" Description="DOB"/>
    <Social_Security_# Datatype="SSN" Description="Social_Security_#"/>
    <Name Datatype="Name" Description="Name">
            <Honorarium Datatype=Honorarium Description="Honorarium"/>
            <First Datatype="First" Description="First"/>
            <Middle Datatype="Middle" Description="Middle"/>
            <Last Datatype="Last" Description="Last"/>
            <Suffix Datatype="Suffix" Description="Suffix"/>
    </Name>
    <Physical_Description Datatype="Description" Description="Physical Decription">
          <Hair_Color Datatype="Hair_Color" Description="Hair Color"/>
          <Eye_Color Datatype="Eye_Color" Description="Eye Color"/>
          <Height Datatype="Height" Description="Height"/>
          <Weight Datatype="Weight" Description="Weight"/>
          <Foot_Size Datatype="Shoe_Size" Description="Foot_Size"/>
    </Physical_Description>
</Person>
```

705

```
<ELEMENT_NAME ATTRIBUTE="ATTRIBUTE VALUE>ELEMENT_VALUE</ELEMENT_NAME>
```

| 715<br>Element Name | 720<br>Attribute<br>'Data Type' Value | 725<br>Attribute<br>'Description' Value | |
|---|---|---|---|
| Identical Match | Identical Match | Identical Match | x,x,x |
| Identical Match | Identical Match | Similar Match | x,x,y |
| Identical Match | Identical Match | No Match | x,x,z |
| Identical Match | Similar Match | Identical Match | x,y,x |
| Identical Match | Similar Match | Similar Match | x,y,y |
| Identical Match | Similar Match | No Match | x,y,z |
| Identical Match | No Match | Identical Match | x,z,x |
| Identical Match | No Match | Similar Match | x,z,y |
| Identical Match | No Match | No Match | x,z,z |
| Similar Match | Identical Match | Identical Match | y,x,x |
| Similar Match | Identical Match | Similar Match | y,x,y |
| Similar Match | Identical Match | No Match | y,x,z |
| Similar Match | Similar Match | Identical Match | y,y,x |
| Similar Match | Similar Match | Similar Match | y,y,y |
| Similar Match | Similar Match | No Match | y,y,z |
| Similar Match | No Match | Identical Match | y,z,x |
| Similar Match | No Match | Similar Match | y,z,y |
| Similar Match | No Match | No Match | y,z,z |
| No Match | Identical Match | Identical Match | z,x,x |
| No Match | Identical Match | Similar Match | z,x,y |
| No Match | Identical Match | No Match | z,x,z |
| No Match | Similar Match | Identical Match | z,y,x |
| No Match | Similar Match | Similar Match | z,y,y |
| No Match | Similar Match | No Match | z,y,z |
| No Match | No Match | Identical Match | z,z,x |
| No Match | No Match | Similar Match | z,z,y |
| No Match | No Match | No Match | z,z,z |

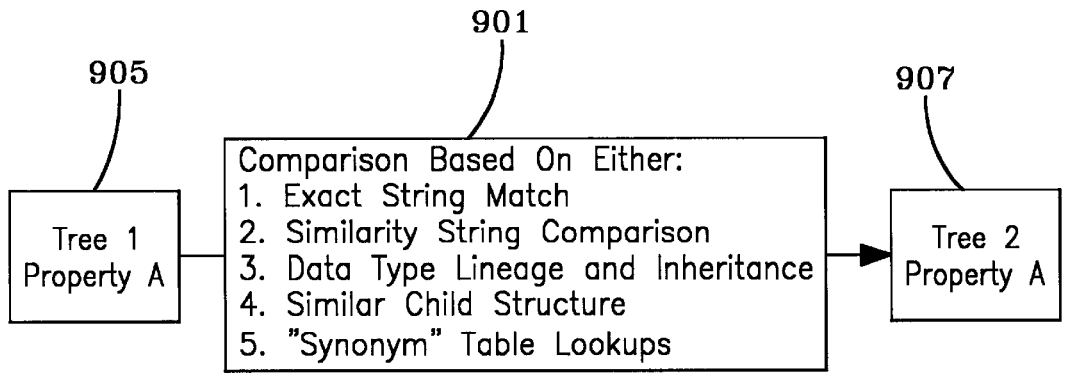
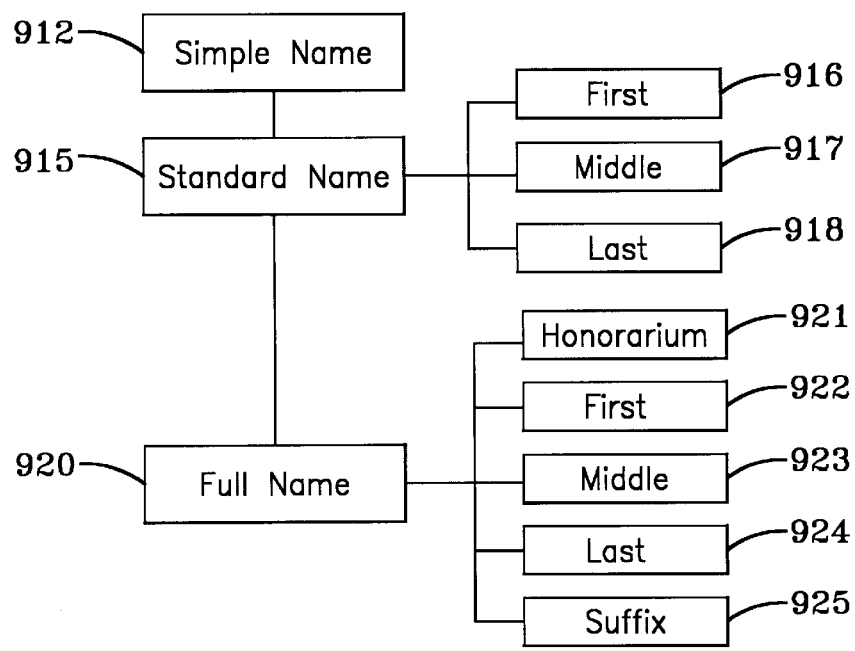
FIG-9A

1100

1. Has the user specified a context-map for the current element into a child of the target?
2. Is there a child of the target node with the identical element name, identical datatype, and identical description as the current element?
3. Is there a child of the target node with the identical element name, identical datatype, and similar description as the current element?
4. Is there a child of the target node with the identical element name, identical datatype as the current element?
5. Is there a child of the target node with the identical element name, similar datatype, and identical description as the current element?
6. Is there a child of the target node with the identical element name, similar datatype, and similar description as the current element?
7. Is there a child of the target node with the identical element name, similar datatype as the current element?
8. Is there a child of the target node with the similar element name, identical datatype, and identical description as the current element?
9. Is there a child of the target node with the similar element name, identical datatype, and similar description as the current element?
10. Is there a child of the target node with the similar element name, similar datatype, and identical description as the current element?
11. Is there a child of the target node with the similar element name, similar datatype, and similar description as the current element?
12. Is there a child of the target node with the similar element name, similar datatype as the current element?
13. Is there a child of the target node with the identical element name, and identical description as the current element?
14. Is there a child of the target node with the identical element name, and similar description as the current element?
15. Is there a child of the target node with the similar element name, identical description as the current element?
16. Is there a child of the target node with the similar element name, similar description as the current element?
17. Is there a child of the target node with a identical description as the current element?
18. Is there a child of the target node with a similar description as the current element?

FIG-11A

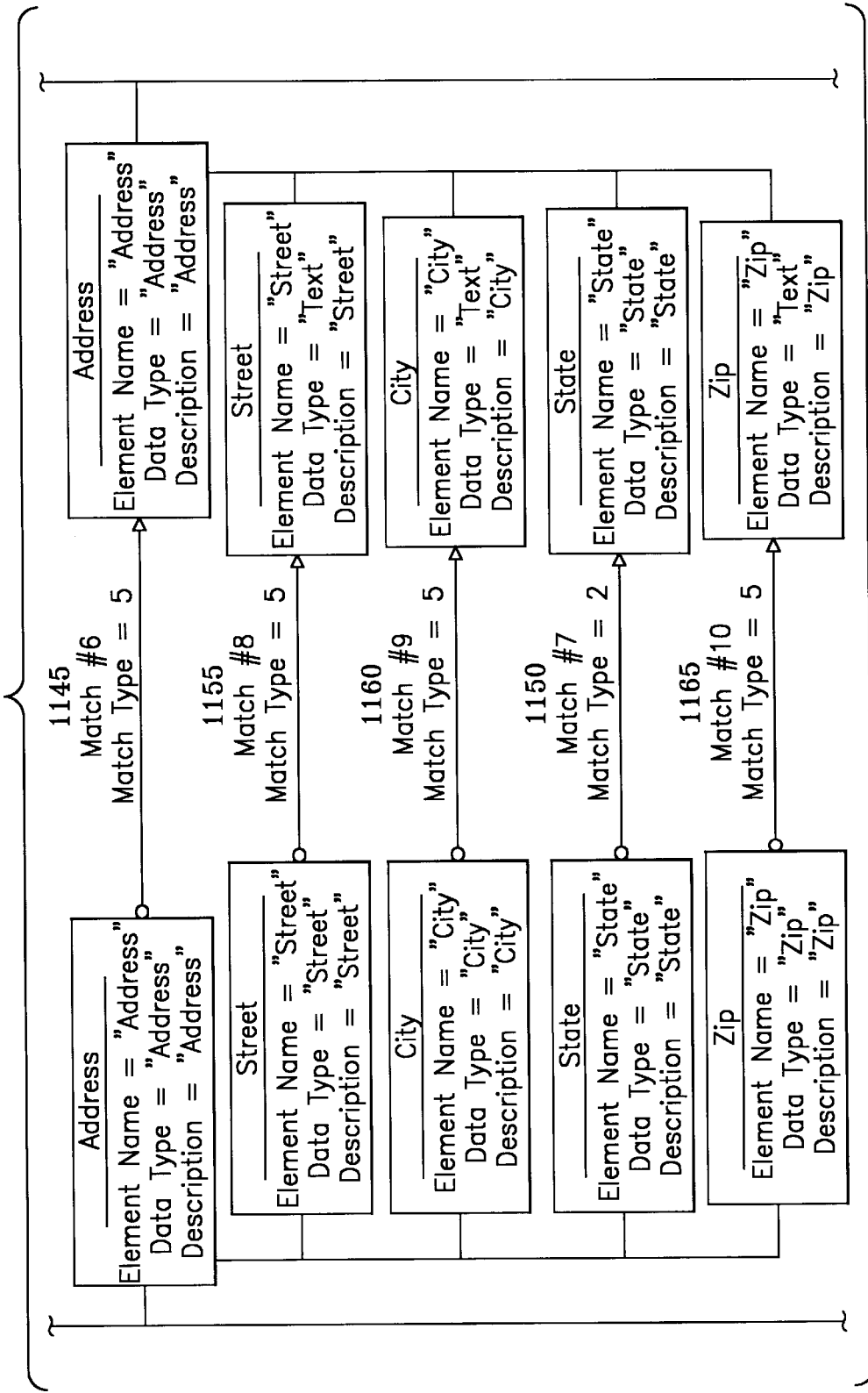

SYSTEM AND METHOD FOR COMPARING HETEROGENEOUS DATA SOURCES

CROSS REFERENCE TO RELATED APPLICATIONS

REFERENCED-APPLICATIONS

This application claims the benefit of U.S. Provisional Application No. 60/223,449, filed on Aug. 4, 2000.

BACKGROUND OF INVENTION

The present invention relates generally to database systems. More particularly, the is a computer-implemented method that allows data in different databases, which may have different formats and structure, to be shared without requiring the data to be remodeled to fit an existing data convention.

Modern information resources, including data found on global information networks, form large databases that need to be searched to extract useful information. With the wealth of information available today, and the value that companies place on it, it has become essential to manage that information effectively using advances in database technology and database integration. However, existing database technology is often constrained by this problem of very large, disparate and multiple data sources.

As a growing number of companies establish Business-to-Business (B2B), Business-to-Consumer (B2C) and Peer-to-Peer relationships using a global communications network such as the Internet, traditional data sharing of large and multiple data sources have become even more problematic. Since data required by businesses is often stored in multiple databases or supplied by third party companies such issues are magnified as companies attempt to integrate the ever-increasing number of internal and external databases. Combining the data from separate sources is usually an expensive and time-consuming systems integration task.

Structured Query language (SQL), Open Database Connectivity (ODBC) and Extensible Markup Language (XML) tools have been developed to facilitate database integration. As beneficial as these technologies may be, they have failed to address the most difficult element of the equation in that often every database is inherently different in its structure and organization as well as its contents. In these differences lie the richness of the original structure and the value of the underlying data.

Current solutions to this problem of inherently different database structure include agreement on a common format and structure of the data being exchanged. Standards bodies and consortia have been established to standardize data structure for various applications. In order to participate in a consortium, all participants' data have to be modeled to conform to the standard data structure. However, the various consortia and standards bodies often have different standards to handle the same types of data. Even if standards are followed, the standards are generally geared toward a specific industry. In addition, standards adoption is slow because each company within each industry often still modifies the data to fit specific company requirements. Given the number of different consortia, standards and industries, the original problem still exists in that there is still no standard way to exchange data and structure between different data structures and databases both within the same industries and between industries.

Given this difficulty for a company to exchange data with a "non-conformant" entity, that is one that uses different data structure standards, the approach is to painstakingly map one field of the data to another. This process must be repeated not only for every field but also for every different type of exchange. These solutions to the exchange problem were generally custom solutions, often "hard-coded". There remains a lack of a generic, used-configurable method for sharing data between different data structures or for transforming one hierarchical data structure to another.

For example, when attempting to store the same type of data or object, such as a customer description, database designers may use different field names, formats, and structures. Fields contained in one database may not be in another. If understood and logically integrated, these ambiguities can provide valuable information. Unfortunately, today's database technology often results in valuable information being cleansed out of the data to make it conform to a standard structure. One example of this is databases that are converted from one representation to another representation and expressed in XML with its corresponding hierarchical structure.

One of the key purposes for the development and use of XML was to solve the problems of data exchange from multiple environments and formats into a single interoperable structure. This is especially important to have seamless B2B electronic commerce (e-Commerce). The reality of XML has proven to be quite different. XML enables data to look much more alike than any previous format. However, there are still problems with using XML to represent data. These problems fall into two major categories: dirty and naturally occurring data perplex XML searching and storage, and data formats or data schemas in the original databases that offer competitive advantage or better reflect the true model of the business and its data are sacrificed to standards consortia. This means that the database formats or schemas have to be fit into the consortia data standards. This requires a highly skilled technical staff to compare one database schema to another and is time consuming. To overcome these well known XML and data exchange barriers, standards are constantly being created for schema creation and data types. However, these standards sacrifice competitive advantage for interoperability. Today, companies require both.

Neither of these problems is resolved with the introduction of data standardization and they continue to plague database integration and prevent true interoperability, especially using XML. Industry has tried to implement the same solution it used for data communication in the 1970's—industry consortia. Standards bodies like RosettaNet, BizTalk, OASIS, ACORD, and a host of others are already being formed to address the problem. Companies are told to configure their data according to a specified model so they can "talk to" any other company within the consortia. However, conforming to industry standards may raise a number of other issues. For example, if data is modeled to a specific consortium standard, it may not be able to communicate with other consortia that use a different model or standard. The handling of legacy data in multiple formats is also an issue.

A problem exists where we have two hierarchical data structures as shown in Table 1. Both of them differ in structure. A hierarchical data structure (which may be contained within a hierarchical database) usually contains root, interior and leaf nodes. Each node in the data structures may contain data or the data may only be contained in the lower level nodes such as leaf nodes. Problems arise when an attempt is made to take the data associated with one structure and apply it to another structure.

TABLE 1

| Structure A (with data) | Structure B |
|---|---|
| Suspect | Offender |
|   Name |   Identification |
|     First="John" |     Name |
|     Middle="Q" |   Address |
|     Last="Public" |     StreetNum |
|   Address |     StreetName |
|     Street="123 Main" |     City |
|     City="AnyTown" |     State |
|     State="TX" |     ZipCode |
|     Zip="02334" | |

Unique computing science disciplines have emerged out of this overload of data and different formats of data. Database Administrators have the sole responsibility to make sure that the data that a company holds is maintained, secured, and available. Chief Information Officers are dedicated to ensure that the movement of data in and out of a company is fluid and effective. Data Modelers are responsible for arranging and presenting the data in a manner that makes sense to the problem being addressed. Within a company, the Information Technology personnel are able to establish guidelines and standards on how information should be modeled. Generally speaking, they model the data to the business in question. For example, a retail sales company may model their data in terms of "customers", "orders", "inventory", "invoices" and the like. A real-estate company may model their information as "clients", "properties" and the like. A problem arises when company "A" tries to share information with company "B" or when Dept. "A" tries to share information with Dept. "B". The structures and hierarchy of data both within the same company and among companies is often different since the data is modeled to meet their individual needs and not modeled to simply map to a common format.

In the past several decades, computerized database management systems have been propelled into the position of being the primary means of data and information storage for small, medium, and large sized organizations. With this fundamental shift from written and printed information storage to computer-based storage, a fundamental shift in the way information is shared between groups has occurred. In the past, information from one organization to another could be shared via printed text, with interpretations of what the text means and how it is structured being embedded in related documents.

With the shift to computer based information storage, sharing data between two entities has become a much more complex problem to solve. The first attempts to solve the problem focused on the ability to simply share or intercommunicate information between two data sources. Once this problem was solved, and computers could effectively share information between two database sources, a second problem then arose.

When information can be shared between database sources, the structure of the data must be the same in order to properly exchange and share information between pluralities of data sources. At first, this seemed a simple enough of a problem to solve. The groups that want to exchange information would simply band together and agree on the specific data formats of the information that is to be shared, then all groups involved would standardize on the format, thus facilitating the interchange of same-structured information. At this point, information can be shared from many different data sources, as long as the data structures are the same between each member in the group. Over time, this prerequisite for sharing information has proven to be a technical, competitive, and financial burden for all companies involved.

SUMMARY OF INVENTION

The present invention is a system and method for allowing data to be shared without requiring that the data be remodeled to fit a common format or convention, which solves the aforementioned needs. The invention relates to the discipline of computer science, database management systems, similarity comparisons of data, similarity comparisons of meta-data information, heterogeneous databases, tree transformation methods, heterogeneous and homogeneous tree segment conversions, distributed computing, object oriented programming, hierarchical databases, heterogeneous data interchange and interoperability, heterogeneous database aggregation, heterogeneous database query result set management.

Comparison of two database structures and searching of information from one database to other databases, or from an external set of search criterion against a plurality of databases are enabled by the present invention. A number of techniques may be use to do this comparison and facilitate the cross database searching. Tree comparison methods, user defined mapping methods, the use of similarity comparisons to determine similar database structures and data, and architectures that facilitate the methods are disclosed herein. These methods facilitate information interchange between heterogeneous data sources. The aggregation of these methods allows data to be interchanged more freely, and with fewer penalties to an organization.

Using the invention, information may be accessed from heterogeneous data sources, or database query sources without having to alter the structure of the data sources that are being searched. By not having to homogenize data sources before interchanging and querying information, time and money are saved by an organization while allowing them to increase their competitive advantage. The invention helps compare two database structures, and facilitates searching information from one database to other databases, or from an external set of search criterion against a plurality of databases. To assist this process, a number of developments have been made to solve specific problems that have been encountered. These include tree comparison methods, user defined mapping methods, the use of similarity comparisons to determine similar database structures and data, and architectures that facilitate the methods disclosed herein. All of these methods facilitate the interchange of information from heterogeneous data sources. The aggregation of these methods allows data to be interchanged more freely, and with fewer penalties to an organization.

Organizations have information that either they want to share or are required to share. External organizations have developed a primary need to cross-compare, or aggregate, information from various data sources. The obvious problem is how to share information across multiple organizations without becoming a competitive, technical, or financial burden. The current invention attempts to solve the problem of data interchange by not forcing companies to change their native data formats in order to share information.

An embodiment of the present invention is a method for matching data contained in a source data structure to data contained in a target data structure, which comprises selecting a set of one or more comparison methods, comparing each node of the source data structure with each node in the target data structure using the selected comparison methods, and determining a measure of similarity between each node of the source data structure and each node of the target data structure. The one or more comparison methods may be selected from the group consisting of exact string match, similarity string comparison, data type lineage and inheritance, similar child structure and synonym table lookup. Each data node may comprise an element name, an element data type attribute, and an attribute description value. The method may further comprise a strategy list whereby selected comparison methods are assigned to each data node element name, each data node element attribute value. The data node element attribute value is selected form the group consisting of attribute data type value and attribute description value. The measure of similarity may be based on a percentage value of similarity. The method may further comprise automatically mapping data from a node of the source data structure to a node of the target data structure if the measure of similarity between the source data structure node and the target data structure node exceed a predetermined threshold value. The method may further comprise manually defining a mapping between selected nodes of the source and target data structures prior to the steps of selecting, comparing, and determining. The method may further comprise manually defining a mapping between selected nodes of the source and target data structures after the automatically mapping step. The mapping process may comprise storing data from the source data structure into the target data structure. The mapping process may comprise storing indices of mapped data for linking data between the source data structure and the target data structure. The automatic mapping step may be selected from the group consisting of many to one element data transformation, one to many element data transformation where a number of source tokens equals a number of target elements, one to many element data transformation where a number of source tokens id greater than a number of target elements, one to many element data transformation where a number of source tokens is less than a number of target elements, many to many element data transformation where a number of source elements equals a number of target elements, many to many element data transformation where a number of source elements is less than a number of target elements, and many to many element data transformation where a number of source elements is greater than a number of target elements. The method may further comprise submitting and executing a search request in the target data structure based on elements in the source data structure. The method may further comprise returning a search result containing data indices and data. The method may further comprise representing each node in a data structure in a language selected from the group consisting of HTML, XML, and SGML. The method may further comprise selecting another set of comparison methods and recursively repeating the steps of comparing and determining a measure of similarity.

In another embodiment of the present invention, a system for matching data contained in a source data structure to data contained in a target data structure comprises a strategy list for selecting a set of one or more comparison methods, means for comparing each node of the source data structure with each node in the target data structure using the selected comparison methods, means for determining a measure of similarity between each node of the source data structure and each node of the target data structure, and indices for designating a mapping between similar nodes of the source and target data structure. A search request from a user application may designate the set of one or more comparison methods. The means for comparing nodes of the source and target data structure may be selected from the group consisting of exact string match, similarity string comparison, data type lineage and inheritance, similar child structure and synonym table lookup. Each node of the source and target data structures may comprise an element name, an element data type attribute and an attribute description value. The means for comparing nodes and determining a measure of similarity between nodes of the source and target data structure may comprise a search engine component. The system may further comprise search index databases for storing the mapping indices. The system may further comprise database management systems for storing the target and source databases. The system may further comprise a data gateway component for accepting a search request from a user application, issuing search commands to a search engine component and a data management component, and sending a result set to the requesting user application. The system strategy list may comprise a matrix of comparison methods for each data structure node comprising element name, attribute data type value, and attribute description value. The mapping may comprise source node data being added to target node data. The system of may further comprise means for enabling a user to manually enter mapping data. The system may further comprise a search engine component for automatically mapping data from a node of the source data structure to a node in the target data structure if the measure of similarity between the source data structure node and the target data structure node exceed a predetermined threshold value.

In another embodiment of the present invention, a computer-readable media contains instructions for controlling a computer system to implement the method described above.

BRIEF DESCRIPTION OF DRAWINGS

These and other features, aspects and advantages of the present invention will become better understood with regard to the following description, appended claims and accompanying drawings where:

FIG. 2 shows three heterogeneous hierarchical tree structures;

FIG. 6 shows a structure of a strategy list;

FIG. 7A shows two Extensible Markup Language (XML) documents that may be used in a heterogeneous database query;

FIG. 7B shows an example of a user ordered strategy list;

FIG. 11A shows a user ordered strategy list; and

FIG. 11B–FIG. 11D show a process of comparing two hierarchical tree structures using an ordered strategy list.

DETAILED DESCRIPTION

Figure 1:
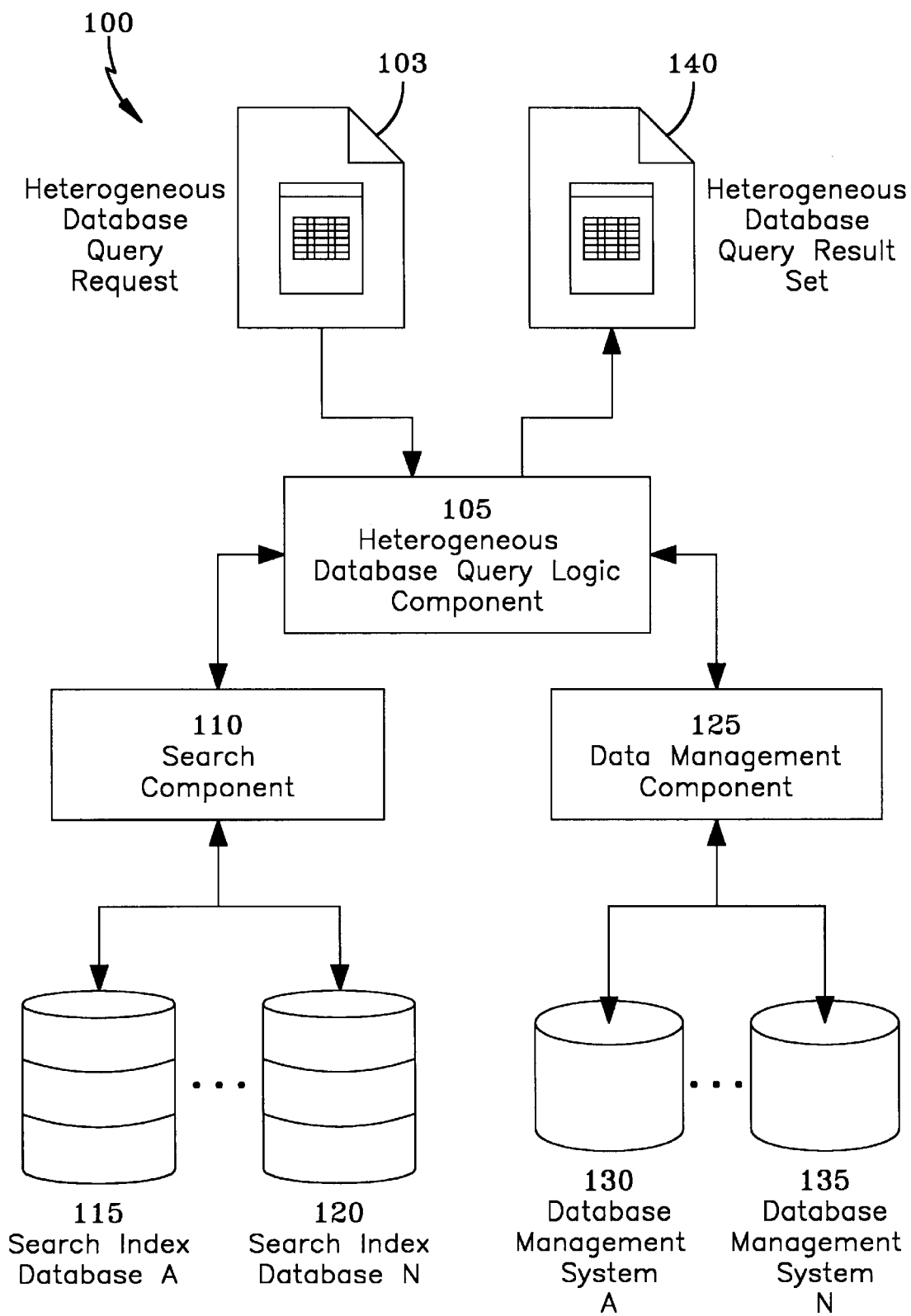
FIG. 1 shows an architectural overview of heterogeneous database search functionality.

Turning now to FIG. 1, FIG. 1 shows an architectural overview 100 of heterogeneous database search functionality. The lifecycle of a heterogeneous database search begins with the formulation of a Database Query Request 103 from a client application. A client application may formulate various types of heterogeneous database queries usually by extracting a plurality of information objects from one database and searching each information object against a plurality of target databases. When a query request has been properly formulated, it is then submitted to a Heterogeneous Database Query Logic Component 105. The Heterogeneous Database Query Logic Component 105 is responsible for interpreting the incoming query command, submitting the query contents to the respective Search Component 110 and Data Management Component 125. The Query Logic Component 105 assembles the resulting set of similar documents produced from the Heterogeneous Database Query 103.

When the Heterogeneous Database Query Logic Component 105 has interpreted a query, the Search Component 110 performs a plurality of search commands contained in the original query. Each search command is interpreted and executed by the Search Component 110. Upon execution, the Search Component 110 then performs a search using search indices located in Search Index Databases 115, 120, to facilitate the search comparisons. Depending on the query structure, similarity comparison commands may be performed using a plurality of search indices contained in the Search Index Databases 115, 120. Upon completing each search, a set of similar resulting objects that are contained in the searched databases are returned to the Heterogeneous Database Query Logic Component 105. This set of information returned by the Search Component 110 is known as a result set.

As each result set is returned to the Heterogeneous Database Query Logic Component 105, a call can be made to the Data Management Component 125, depending on the output request specified in the Database Query Request 100. A result set does not require contact with the Data Management Component 125, but there are cases where a result set needs to be filled in with various levels of information from the database source where the search indices were derived. If a result set gets forwarded to the Data Management Component 125, the information inside of the result set is extracted from a Database Management System 130, 135 at various levels of detail. Result sets can be forwarded to the Data Management Component 125 for data retrieval from a plurality of data sources 130, 135. Depending on the query request, data extraction levels may include, but are not limited to full data entity extraction, summary data entity extraction, or partial data entity extraction.

The result sets from the Search Component 110 and the extracted data from the Data Management Component 125 is forwarded via the Heterogeneous Database Query Logic Component 105 to a client application as a Heterogeneous Database Query Result Set 140.

Turning now to FIG. 2, FIG. 2 shows three heterogeneous hierarchical tree structures 200, 204, 208. Heterogeneous tree structures are a collection of hierarchical data entities that do not share the same structure. A hierarchical data entity is a method of displaying complex data relationships within one set of information. Hierarchical data entities may be represented in an object hierarchy by a hierarchical markup language such as HTML, XML, or SGML, or any other format that can display a hierarchy of interrelated information.

For example, let a hierarchical data entity 200, depicted as Tree A, be represented as a person 210. The person may have certain data attributes that pertains to he or she such as 'Date of Birth' 215, 'SSN' 220, 'Name' 225, and 'Physical Description' 230. Within this hierarchy may exist compound attributes such as 'Name' 225 and 'Physical Description' 230 which may encapsulate certain attributes into its domain. Using this methodology, complex interrelationships within a data point can be maintained. A second representation of a hierarchical data entity, Tree B 204 is represented by a person 235, but contains heterogeneous data elements different from the first hierarchical entity 200, such as expanded name 250 and physical description 260 attributes such as 'Honorarium' 251, 'Suffix' 255, and 'Foot Size' 265. A third hierarchical data entity, Tree C 208 is represented as a customer 270 with attributes for 'DOB' 275, 'Social Security #' 280, 'Name' 285 and 'Profile' 295. The representation of the three different hierarchical data entities 200, 204, 208 may be designated as heterogeneous tree structures.

With heterogeneous tree structures there may often be attributes that are shared across the different structures by virtue of subset, superset, exact structure match, synonym, and similar structure match relationships. A subset can be represented where a name attribute 225 in Tree A 200 is contained in both Tree B 204 and Tree C 208. A superset relationship exists where name attributes 250, 285 in Tree B 204 and Tree C 208 are represented in abbreviated form 225 in Tree A 200. An exact structure match is represented by the attributes 'DOB' 240, 275, 'Social Security #' 245, 280, and 'Name' 250, 285 in both Tree B 204 and Tree C 208. A synonym match is represented by a preprogrammed mapping that one data attribute is a synonym of another different attribute. A similar structure match is represented by the attribute 'Physical Description' 230 in Tree A 200 which has a similarity relationship to the attribute 'Description' 260 in Tree B 204 by virtue of a similarity description comparison and the attributes that both fields share.

With the representation of heterogeneous tree structures and the methods of comparison between those structures, a method of transforming one tree structure to other tree structures may be defined. With the existence of three heterogeneous tree structures A 200, B 204 and C 208, there are three possible sets of transformations that can occur between them as shown in Table 2. From Tree A 200, a transformation can be made to heterogeneous structures Tree B 204 and/or Tree C 208. From Tree B 204, a transformation can be made to heterogeneous structures Tree A 200 and/or Tree C 208. From structure Tree C 208, a transformation can be made to structures Tree A 200 and/or Tree B 204.

TABLE 2

| Tree A → Tree B and Tree C | Tree B → Tree A and Tree C | Tree C → Tree A and Tree B |
|---|---|---|
| Tree A → Tree B or Tree C | Tree B → Tree A or Tree C | Tree C → Tree A or Tree B |

Figure 3:
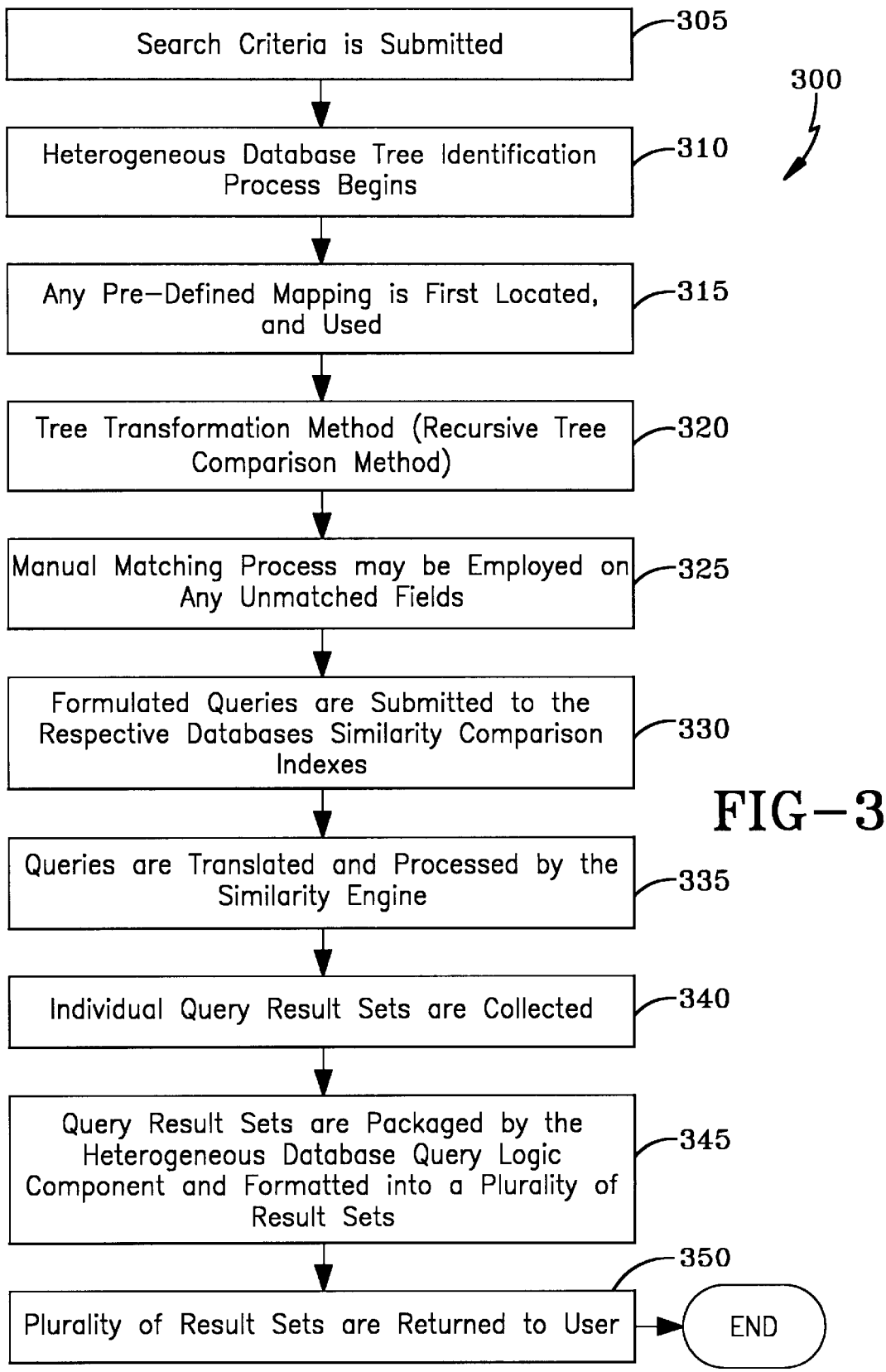
FIG. 3 shows the workflow for performing a heterogeneous database query.

Turning to FIG. 3, FIG. 3 shows the workflow 300 for performing a heterogeneous database query. To perform a heterogeneous database search, a series of steps are followed. First, search criteria are developed through a client interface 305. Search criteria may come in the form of a single or a plurality of hierarchical data entities from one or more data sources. In addition, search criteria may be specified as one hierarchical data entity, which can be searched against another hierarchical data entity. When the search criteria have been submitted, the heterogeneous tree identification process of transforming the search criteria into the plurality of target heterogeneous tree structures begins 310.

The first step in the tree transformation process is to determine if there is any user defined mapping from one tree structure to another 315. User defined mapping can be specified in the data entity hierarchy or through an externally associated file. The user defined mapping effectively pairs each hierarchical tree entity to another entity in a separate, heterogeneous tree structure. The mappings can be specified for the entire data entity, or a subset of attributes represented in the hierarchical data entity. For attributes that contain user defined mapping, data can be directly transferred from one attribute in a hierarchical structure to another attribute in another heterogeneous hierarchical structure.

The second step in the tree transformation process is to evoke an automated tree transformation method 320 so that the data in one hierarchical tree structure can be represented as the data in another hierarchical tree structure. Data from an original query tree is applied to a target query tree. The tree transformation method 320 employs a user defined strategy list, which contains different permutations of how to compare different properties of two hierarchical tree structures and the methods from which the properties can be compared. The tree transformation method 320 works in a recursive manner, drilling down the hierarchical structure attempting to match up each position in both trees by a number of different comparison methods.

As the tree transformation method 320 is completed, there is a possibility of not all fields from one tree being matched to another tree. In this case, a manual matching process 325 may be employed to pair the remaining unmapped and untransformed data values from the source tree to the target heterogeneous tree structures. The manual matching process 325 requires user input and interpretation to properly associate how one tree properly maps and transforms to one or more heterogeneous tree structures.

At this point, all of the values that are to be searched have been transformed into one or more native heterogeneous tree structures. With the hierarchical entity to hierarchical entity transformation process complete, the resulting structure can now be described as a search submittal by formulating queries 330 that are sent to respective similarity comparison components for searching. From this point a similarity search is performed, respectively, on each transformed formulated query request 330. During the search execution, each item that is contained in the query request is compared at a hierarchical level to every other hierarchical object that is contained in the similarity search indices.

The result of the search process is a set of hierarchical objects contained in the indices that have an aggregate comparison score determined using search measures, and weighting methods when aggregating scores 340. Search measures are programmed methods of comparing various types of data and information. Examples of search measures might be, but are not limited to, Street Address, Date, Text, Long Text, Phone Number, Drivers License, etc. Aggregate weighting is used to fine tune search results for fields such as 'Name', where its sub fields 'First' and 'Last' might have a larger weighting factor than 'Middle' and 'Honorarium'. The collection of information output from a search is designated as a result set.

The result set can contain, but is not limited to, a series hierarchical object references and the corresponding comparison score for each reference. Each query requests respective result set can then be transmitted synchronously, or in a collection, back to the heterogeneous database query component 340. The heterogeneous database query component can then perform a series of logical aggregation or partitioning techniques for conglomerate of search results 345. At this point, the process is completed by the amalgamated heterogeneous query result set being returned to the query requestor client 350.

Figure 4:
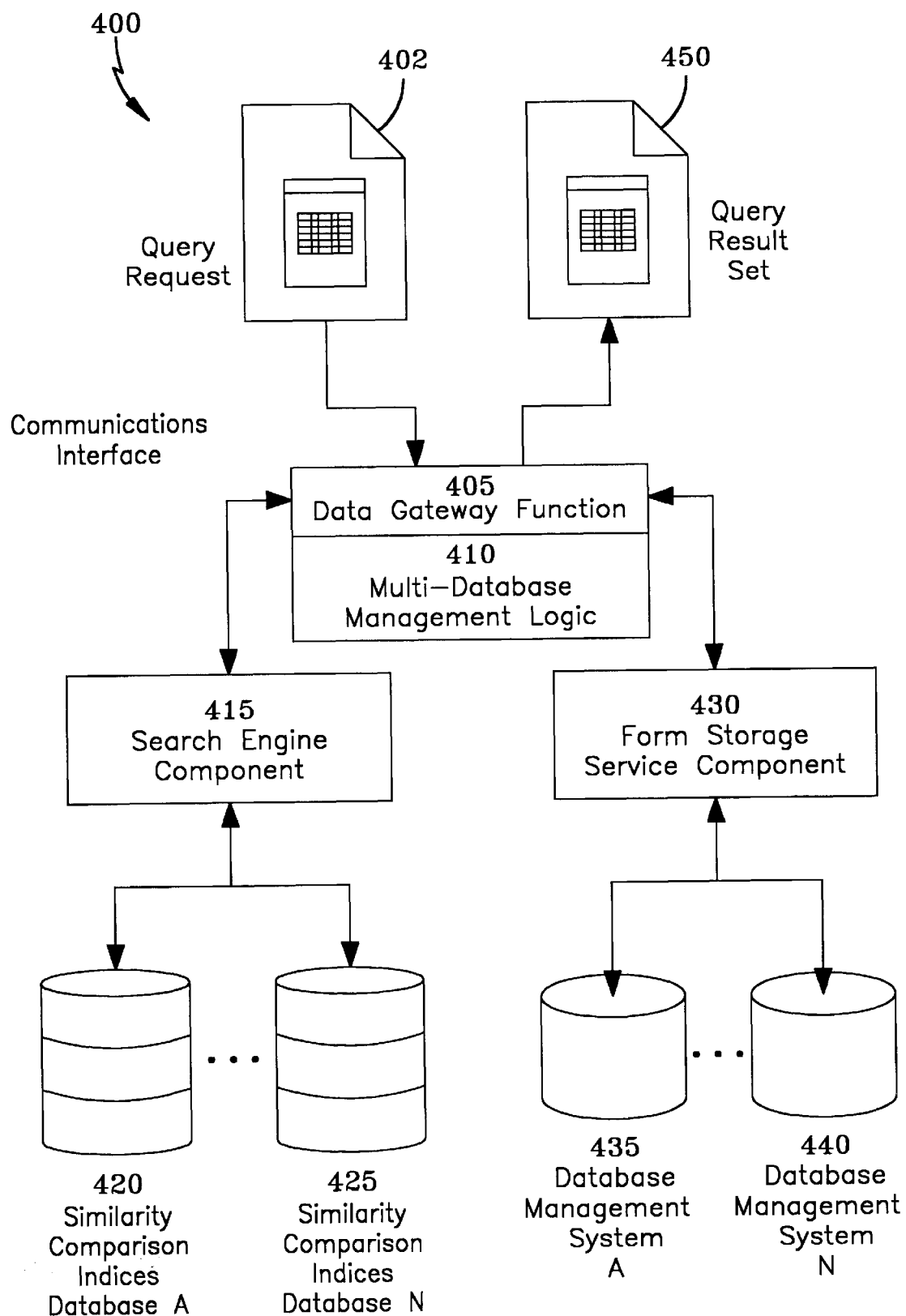
FIG. 4 shows an embodiment of a heterogeneous database search functionality used in the Search Engine Server.

Turning to FIG. 4, FIG. 4 shows an embodiment of a heterogeneous database search functionality 400 used in the Search Engine Server. A heterogeneous database search functionality 400 is displayed in the implementation of a Search Engine Server architecture. A heterogeneous database query request 402 is submitted by a client application to the search engine for processing. The heterogeneous query request 402 will already have been formulated and transformed into the proper search request from one heterogeneous tree structure to another. At this point, the transformed query need only be submitted to the database the search is targeted against. The Data Gateway Function 405 receives the query request 402, and is responsible for interpreting the contents of the request and issuing commands to both the Search Engine Component 415 and Form Storage Service Component 430. The Data Gateway Function 405 is responsible for managing intercommunications between the client application Query Request 402 and the Search Engine Component 405 and Form Storage Service Component 430. A second purpose of the Data Gateway Component 405 is to manage and maintain the interactions with and between multiple databases via the Multi-Database Management Logic 410.

When the Data Gateway Function 405 has formulated a search command, it is then forwarded onto the Search Engine Component 415. The Search Engine Component 415 then interprets the search command and performs a search on the respective Comparison Indices Databases 420, 425. The comparison indices in the respective databases 420, 425 are then used to perform the comparisons for all attributes and data entities contained in the query request 402. In addition, the Search Engine Component 415 may perform searches on a plurality of other comparison indices. Upon completing a search on the criteria in the Query Request 402, a result set of data entities, with their respective comparison score, are then sent back to the Data Gateway Function 405.

Depending on the Query Request 402, data may or may not be appended to the result set using the Form Storage Service Component (FSS) 430. If it is specified to append either summary information or the entire data entities to the result set, the FSS 430 is then responsible for performing the task of extracting information from a specific Database Management System 435, 440. The FSS 430 is structured somewhat like the Search Engine Component 415 in that they both can manage information from a plurality of heterogeneous data sources. When the result set is forwarded to the FSS 430 along with the query criteria, data can then be extracted from the specified databases 435, 440 and appended into the result set document. At this point the result set contains the query command, the comparison results, and, if applicable, the data entities for the results specified in the comparison results.

Upon completing any applicable insertion of data entities into the result set, the FSS 430 then returns the result set back to the Data Gateway Function 405. At this point, the processing by the Search Engine Server 400 is complete, and the Query Result Set 450 is then prepared and sent back to the applicable client that submitted the Query Request 402.

Figure 5A:
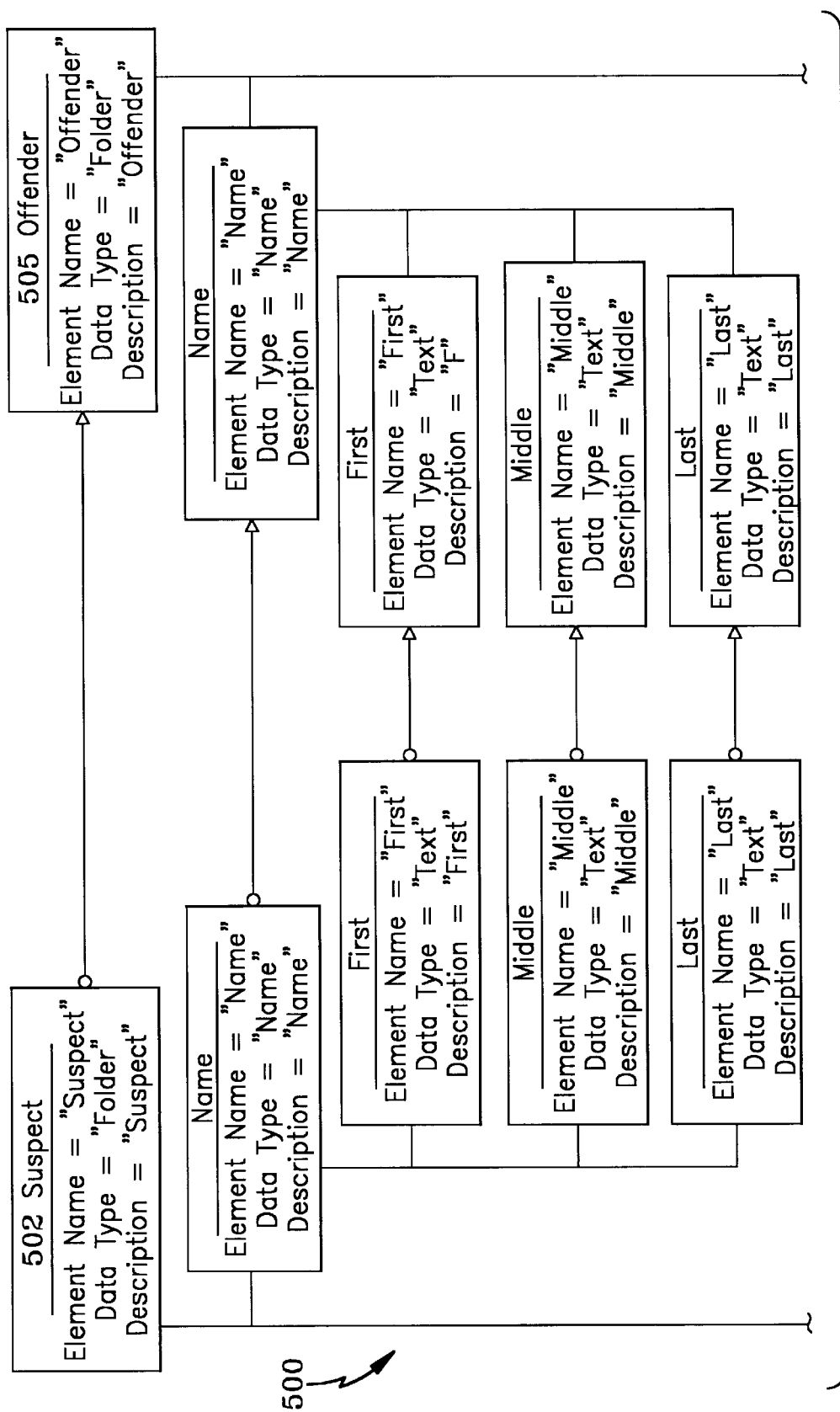
FIG. 5 shows an example of a mapping between two heterogeneous tree structures.
Figure 5B:
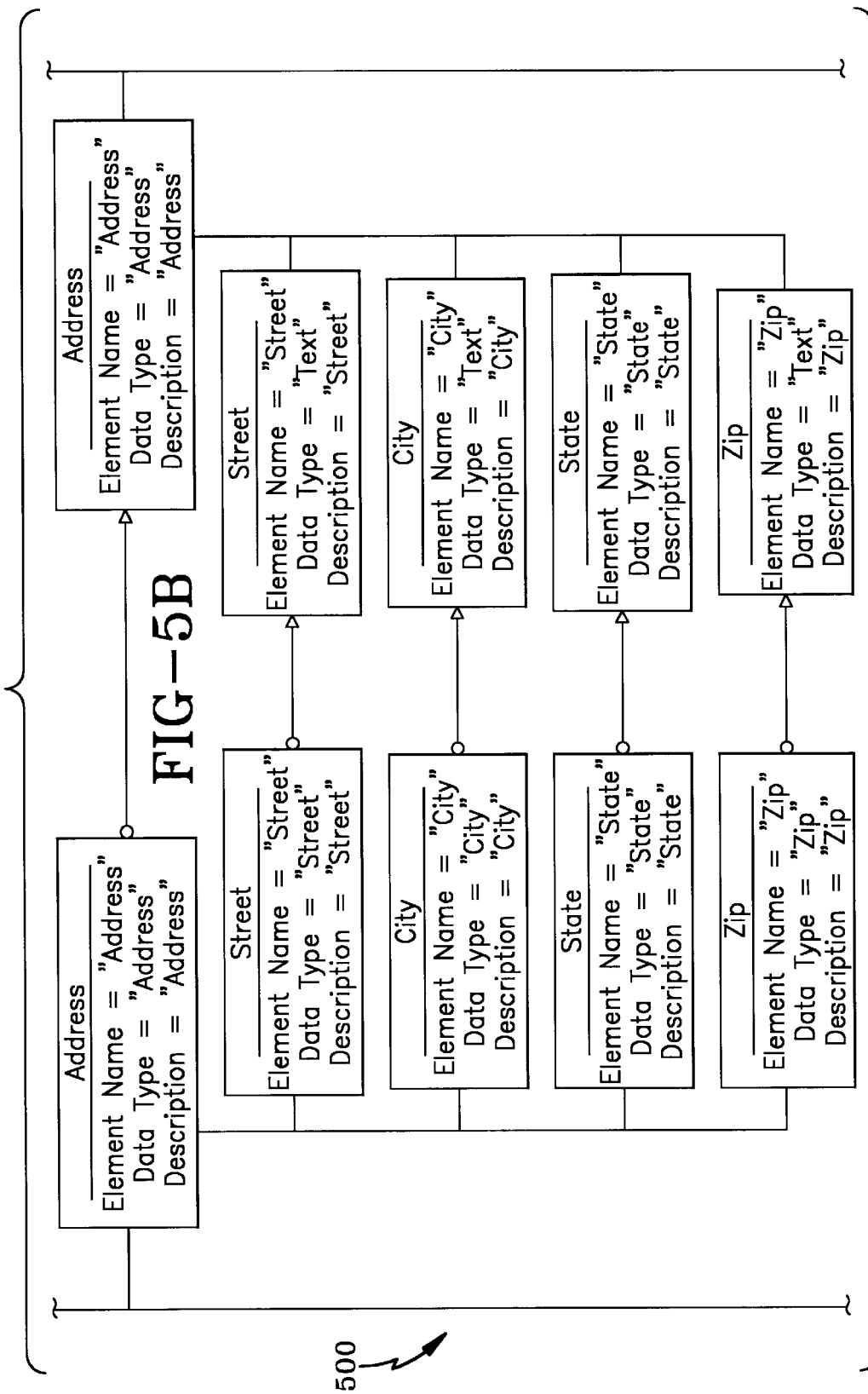
Figure 5C:
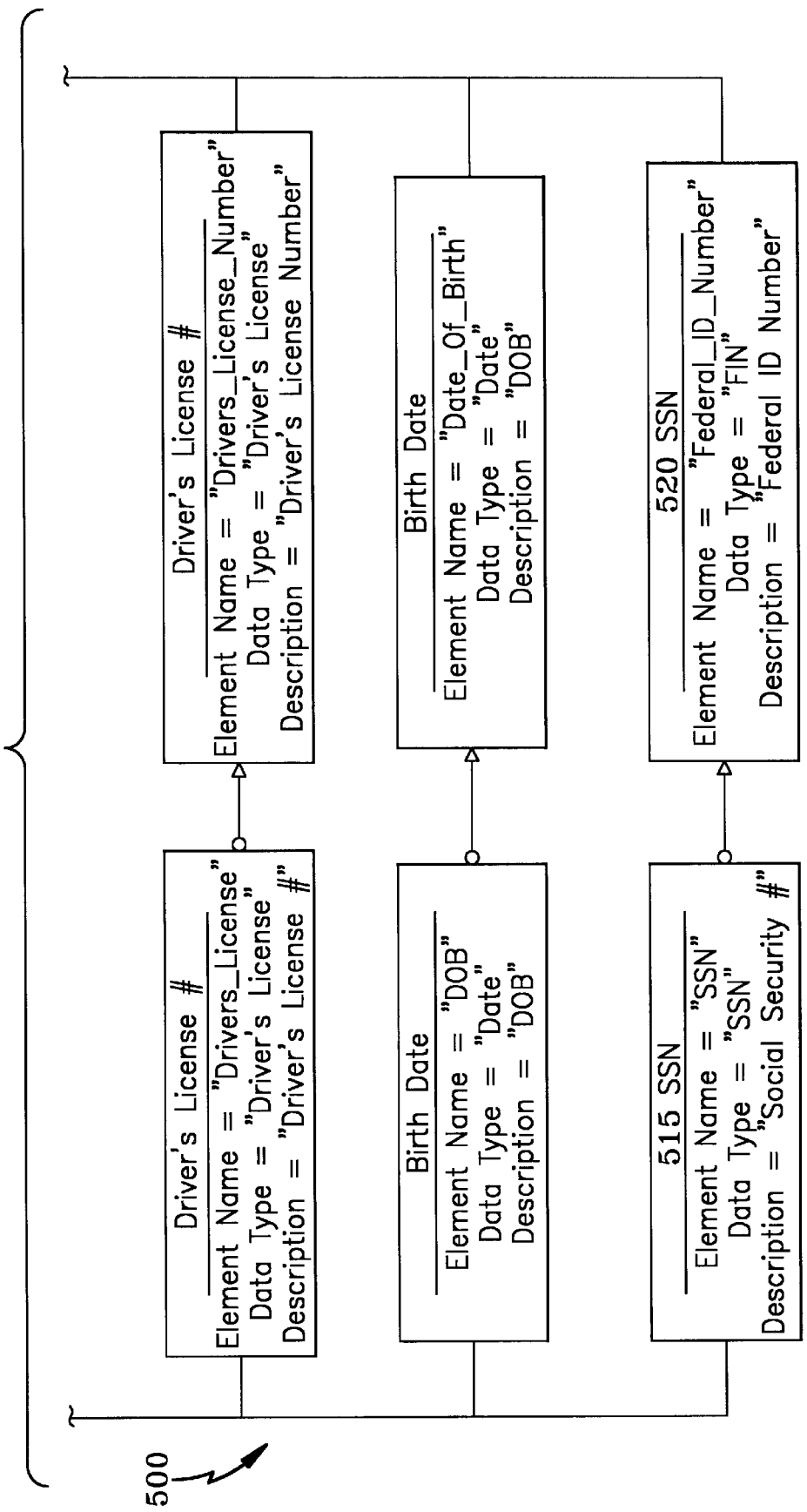

Turning to FIG. 5, FIG. 5 shows an example of a user-defined mapping 500 between two heterogeneous tree structures. User defined mapping 500 may be employed before or after an automated hierarchical transformation method is used. When using user defined mapping before a transformation method is used, the user has knowledge of how to map one hierarchical structure to another. Using this method, a query in one hierarchical structure can be transformed into another for every user defined mapped field. The transformed query can then be submitted to the respective similarity comparison component for query processing.

In some cases, the automated hierarchical transformation method cannot transform all of the data points in one tree to another. In this case, a user can specify mapping from one hierarchical structure to another after the automated hierarchical transformation method has completed. The user can then map all of the fields that could not be transformed automatically from one hierarchical structure to another. Once the user has completed the mapping, the transformed query can then be submitted to a similarity comparison component for query processing.

To perform user defined mapping, one hierarchical tree structure is mapped to another by bridging individual fields from one structure to another. For example, consider a 'Suspect' element 502 from one hierarchical structure and map it to another heterogeneous structure. We will use a second heterogeneous hierarchical database structure known as 'Offender' element 505 to map the 'Suspect' element 502 to the other hierarchical structure. Through user defined mapping, a user can specify that the data for the heterogeneous field 'Suspect' 502 in the first hierarchical tree structure should be transformed into the field 'Offender' 505 in the second hierarchical tree structure. This process may be repeated for any number of data elements contained in the pair of hierarchical tree structures. If the user is performing user defined mapping before an automated hierarchical transformation, most to all fields in both trees should be available for mapping. If the user is performing user defined mapping after an automated hierarchical transformation, the remaining difference of unmapped fields from both tree structures are available for mapping. An exception to this may be when the user desires to override the automated hierarchical transformation mapping properties, so that they can specify their own mapping for a plurality of fields.

Turning to FIG. 6, FIG. 6 shows a structure of a strategy list 600. In order to transform one hierarchical tree structure into another, both trees have to be compared to one another to determine how one tree structure relates to another. A strategy list 600 is used to perform this operation. A strategy list 600 is a matrix of comparison types and comparison methods that help determine how one hierarchical tree can be best transformed into the structure of another hierarchical tree. A strategy list 600 contains a series of permutations of different comparison types coupled with various comparison methods. For example, one tree could be compared to another tree by using a comparison type of a descriptive name property in each tree. The comparison method can be an exact match method for the literal description of these two property instances. Using this permutation, if both trees contain the descriptive name property and they are both spelled exactly the same; the values from one segment of the tree can be transformed into the other tree.

A matrix that contains different combinations of comparison types and comparison methods can be represented as strategy list 600. A comparison type can be described as the criteria available to compare a plurality of tree structures. For the current example, comparison types are distributed along the horizontal rows or X-axis of the matrix where comparison types A, B, C, and N 601 represent different parts of the hierarchical tree structures that can be compared. The amount of comparison types is extendable to the number of types of comparisons that can be made between two tree structures.

Beginning down the vertical columns or Y-axis, a number of different comparison methods are specified for each comparison type identified in the first row 601 along the X-axis. As the rows in FIG. 6 are traversed downward, a number of different search strategies are specified in each row. A comparison method is a method of comparing a plurality of tree structures. Examples of comparison methods are not limited to an exact description string match, similar string match, data type name match, and synonym match. In the second row 605 of the matrix, a series of comparison methods are specified for each comparison type specified in the first row 601. Different permutations of comparison methods can be specified down the Y-axis for each comparison type specified in the first row 601. For example, using permutations of comparison methods 1, 2, 3, and 4 for comparison types A, B, C, and N, as shown in the third row 610, a series of combinations can be created. Displaying the permutations in Cartesian coordinates, a series of strategies can be described.

In the first strategy 605, a set of coordinates are specified as (A, 1), (B, 1), (C, 1), and (D, 1). In the second displayed strategy 610, a set of coordinates are specified (A, 1), (B, 2), (C, 3), and (D, 4). In the third displayed strategy 615, a set of coordinates are specified (A, 2), (B, 2), (C, 2), and (D, 2). In the fourth displayed strategy 620, a set of coordinates are specified (A, 2), (B, 1), (C, 3), and (D, 4). In the fifth displayed strategy 625, a set of coordinates are specified (A, 3), (B, 3), (C, 3), and (D, 3). In the sixth displayed strategy 630, a set of coordinates are specified (A, 3), (B, 1), (C, 2), and (D, 4). In the seventh displayed strategy 635, a set of coordinates are specified (A, 4), (B, 4), (C, 4), and (D, 4). In the final displayed strategy 640, a set of coordinates are specified (A, 4), (B, 1), (C, 2), and (D, 3).

To simplify the example, the rows of different permutations between each row in the example were not displayed. Between each row displayed a series of different permutations of comparison type/comparison method intersections may be specified. Generally, the total number of permutations that a user can specify in an ordered permutation list is represented in an equation where the total possible permutations are equal to the number of comparison methods raised to the power of the number of comparison types. In general, the total number of possible permutations $P_t$ is:

$$P = (\text{number of comparison methods})^{(\text{number of comparison types})}$$

where comparison methods are the methods that may be used to facilitate the comparison of two tree structures, and comparison types are the criteria available to compare tree structures, and is not limited to computer-based object properties, elements, element values, attributes and attribute values.

Turning to FIG. 7, FIG. 7A shows two Extensible Markup Language (XML) documents 700, 705 that may be used in a heterogeneous database query. FIG. 7B shows a strategy list 730, which enables a user to define a series of comparison arguments in order to compare two hierarchical tree structures 700, 705, as shown in FIG. 7A. One example of using a strategy list is where an extensible markup language (XML) structure is compared to another structure for a number of comparison types and methods. For example, Document A 700 contains an XML element structure describing a person; and includes added information as attributes for data type and description. Document B 705 also contains an XML element structure to describe a person but is slightly different than Document A 700 in element structure, data type values, and description values. Generally, an XML structure can be described as containing an element name, an element value, and a series of attributes with their respective attribute values 710, as shown in FIG. 7A.

Defining a strategy list to transform the structure of Document A 700 into the structure of Document B 705 requires, in this example, using comparison types of element name, attribute value for 'datatype', and attribute value for 'description'. Using the comparison type for Element Name, 715 in FIG. 7B, the two structures will be compared for the XML Element Name 715 property of the structure. Using a comparison type for the value of the Attribute Datatype, 720 in FIG. 7B, each structure can be compared to see if the Attribute Datatype 720 for the element is the same, or compatible. Using a comparison type for the value of the Attribute Description, 725 in FIG. 7B, each structure can be compared to for the Description Value 725.

For each of the comparison types, the matrix of comparison methods 730 of identical match, similar match, and no match can be specified. This is where the notion of permutations comes up; for each comparison type, a comparison method can be specified. Given a set of pairings of comparison methods for Element Name 715, Attribute Datatype Value 720, and Attribute Description Value 725, a strategy may be established. A series of these combinations, or permutations is what is known as a strategy list 730. A strategy list 730 can be ordered by the user, and may exclude certain permutation combinations.

Listed in the example shown in FIG. 7B are all possible combinations for the listed Comparison Types and Comparison Methods. Comparison Types include Element Name, Element Attribute Value for 'Datatype', and Element Attribute Value for "Description". Comparison Methods include identical match (x), similar match (y) and no match (z). Taking the number of comparison methods and raising them to the exponential power of the number of comparison types can express the total number of permutations for this example.

$$P = (\text{number of comparison methods})^{(\text{number of comparison types})}$$

For example, there are actually three comparison types and three comparison methods used. Using the equation for determining the total number of possible permutations, three to the power of three equals twenty-seven, which represents the total number of permutations.

Figure 8:
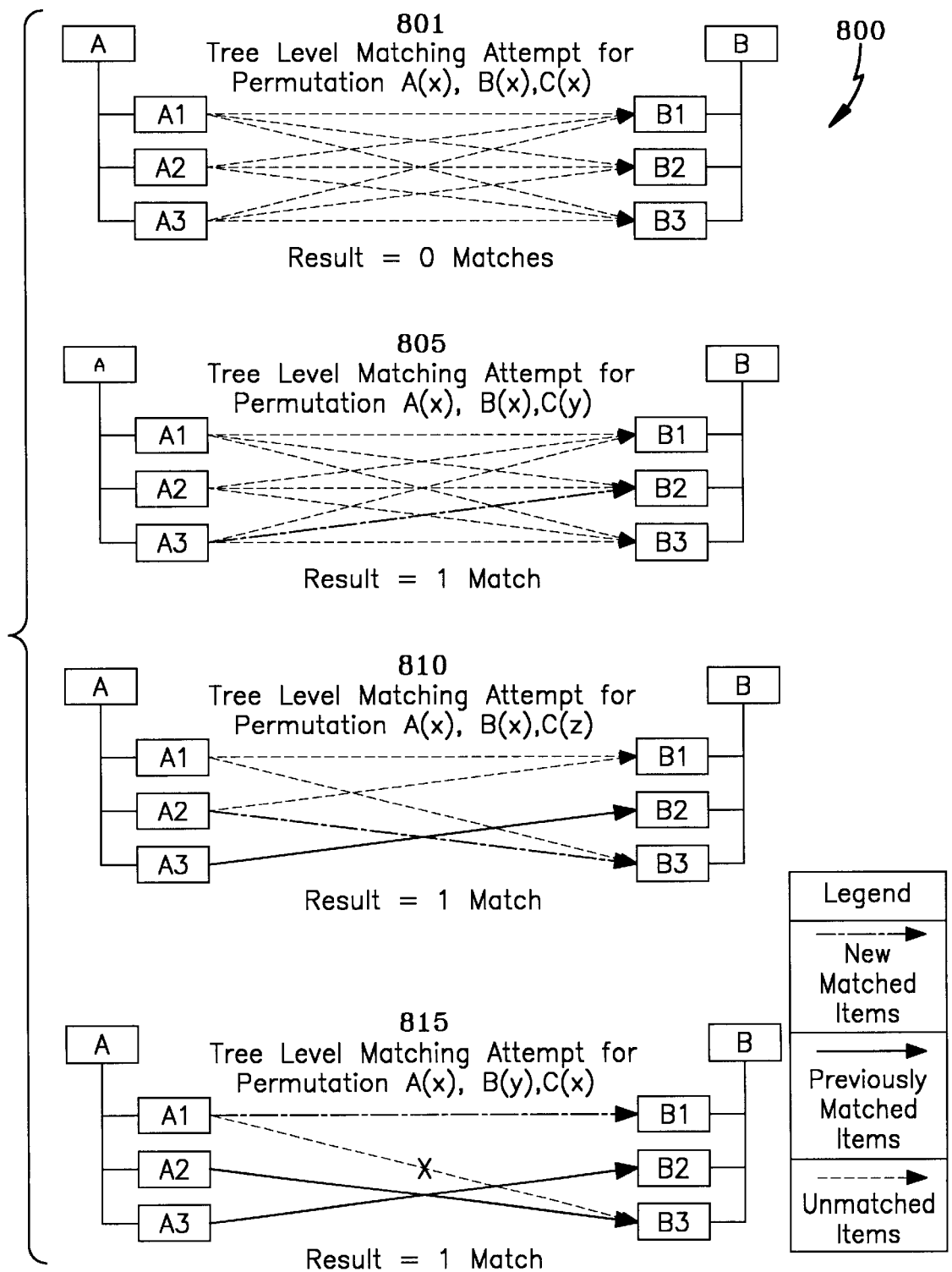
FIG. 8 shows an example of how two tree segments are compared using an ordered strategy list.

Turning to FIG. 8, FIG. 8 shows an example of how two tree segments are compared using an ordered strategy list. In order to compare two hierarchical structures using an ordered strategy list, a tree matching method is used. The tree matching method entails a process of how to compare two hierarchical tree segments for various strategies contained in a strategy list. This process is repeated recursively until the entire tree has been mapped, and transformed, into the other tree structure. If all strategies fail in the strategy list, a manual mapping process can be employed for all fields that have not been matched in the automated method. Otherwise, the heterogeneous database query has been best transformed according to the strategy list and awaits submission to the respective database.

FIG. 8 depicts two heterogeneous hierarchical tree structures 800 that are being transformed for a heterogeneous database query in a step-wise fashion. Within the two hierarchical tree structures 800 are contained a plurality of tree segments (A, B), which contain one node with a plurality of child nodes ($A_1, A_2, A_3, B_1, B_2, B_3$) 801. Using tree segment node A, an attempt is made to locate a matching tree segment in the target tree node B using a strategy [A(x), B(x), C(x)] that is contained in the strategy list 801. For each strategy specified in the list for each unmatched node from tree segment A to tree segment B, an attempt is made to match the two tree segments. In a first strategy 801, node $A_1$ is attempted to be matched against nodes $B_1, B_2$, and $B_3$ for one strategy. Second, node $A_2$ is attempted to be matched against nodes $B_1, B_2$, and $B_3$ for one strategy. Third, node $A_3$ is attempted to be matched against nodes $B_1, B_2$, and $B_3$ for one strategy. In this example 801, all attempts to match the tree segments using strategy [A(x), B(x), C(x)] consequently fail.

When the first strategy 801 fails for all three nine node matching attempts, the matching process then moves onto the next matching strategy 805. Using strategy [A(x), B(x), C(y)], the tree matching process 805 repeats itself for each node in tree A. After attempts for matching nodes $A_1$ and $A_2$ fail, an attempt for matching node $A_3$ succeeds. The match for node $A_3$ succeeds via strategy method [A(x), B(x), C(y)] 805 to tree B for node $B_2$. Following the match, the nodes in each tree are marked as mapped, and subsequently will not be used in any future comparisons between the two tree structures. Following the match, there are no more strategy attempts to be made at the current level. Thus the next strategy will attempt to match the remaining unmapped nodes.

When the third strategy 810, [A(x), B(x), C(z)], is employed, there are only two nodes in tree A that remain to be mapped to tree B. Using the third strategy 810, another attempt is made to match up nodes in tree A to nodes contained within tree B. The attempt for node $A_1$ fails for both nodes in tree B, but the attempt for node $A_2$ succeeds to match to tree B's node $B_3$. At this point, both matched nodes are marked as 'mapped' and the tree matching process moves onto the next strategy in the strategy list.

Using the fourth strategy 815, [A(x), B(y), C(x)], an attempt is made to match up the two remaining nodes in the two tree segments. The first matching attempt is actually a success and nodes $A_1$ and $B_1$ are marked as mapped. Since there are no more available nodes to map at this tree segment, the matching process 815 is completed, and no other matching attempts are made at this segment in the tree. At this point, the tree matching process attempts to drill down into, or back up the hierarchical tree structure, depending on what tree segments are being compared, and where they are contained in the hierarchical structure. As the recursive process continues through the hierarchical tree structure, more and more nodes are mapped if they match a particular strategy. If the process has exhausted all strategy list attempts, a shift to manual matching can be made in order to attain the best possible mapping between tree structures A and B.

Figure 9B:
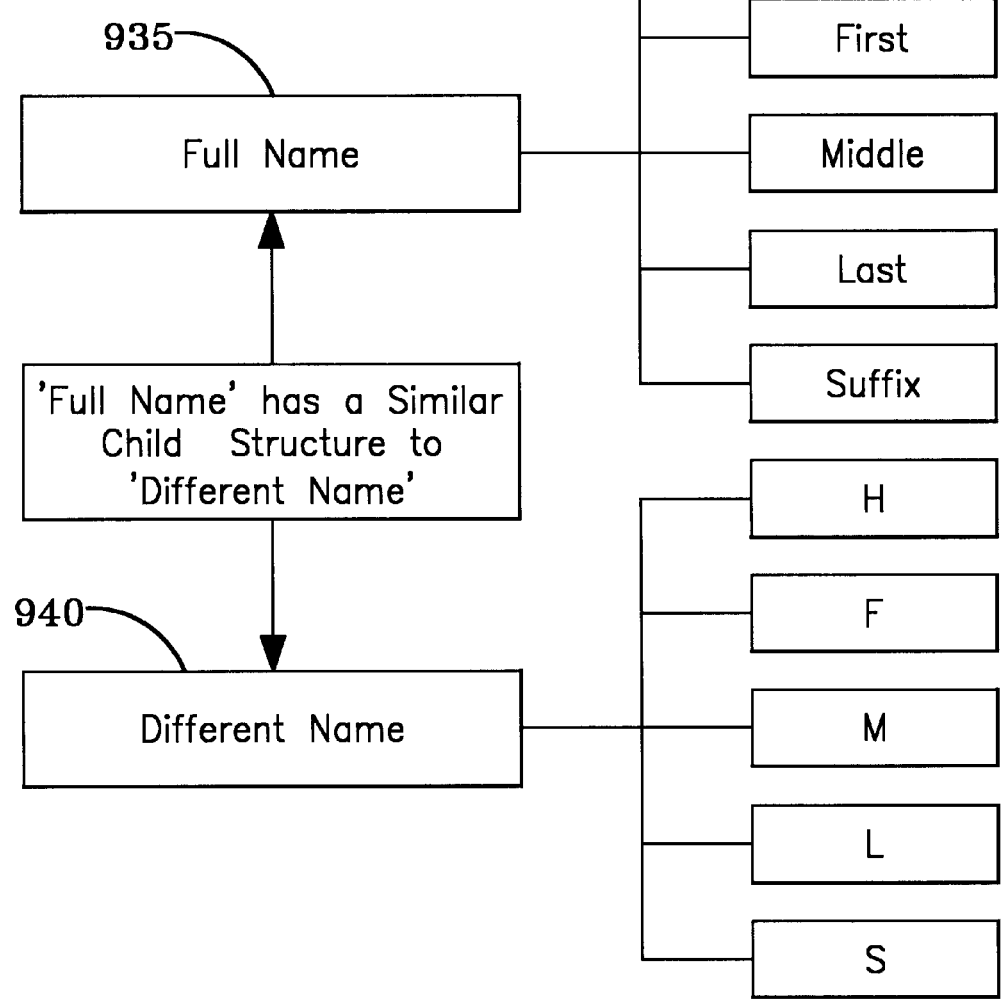
FIG. 9 shows different types of methods for hierarchical tree transformations.
Figure 10A:
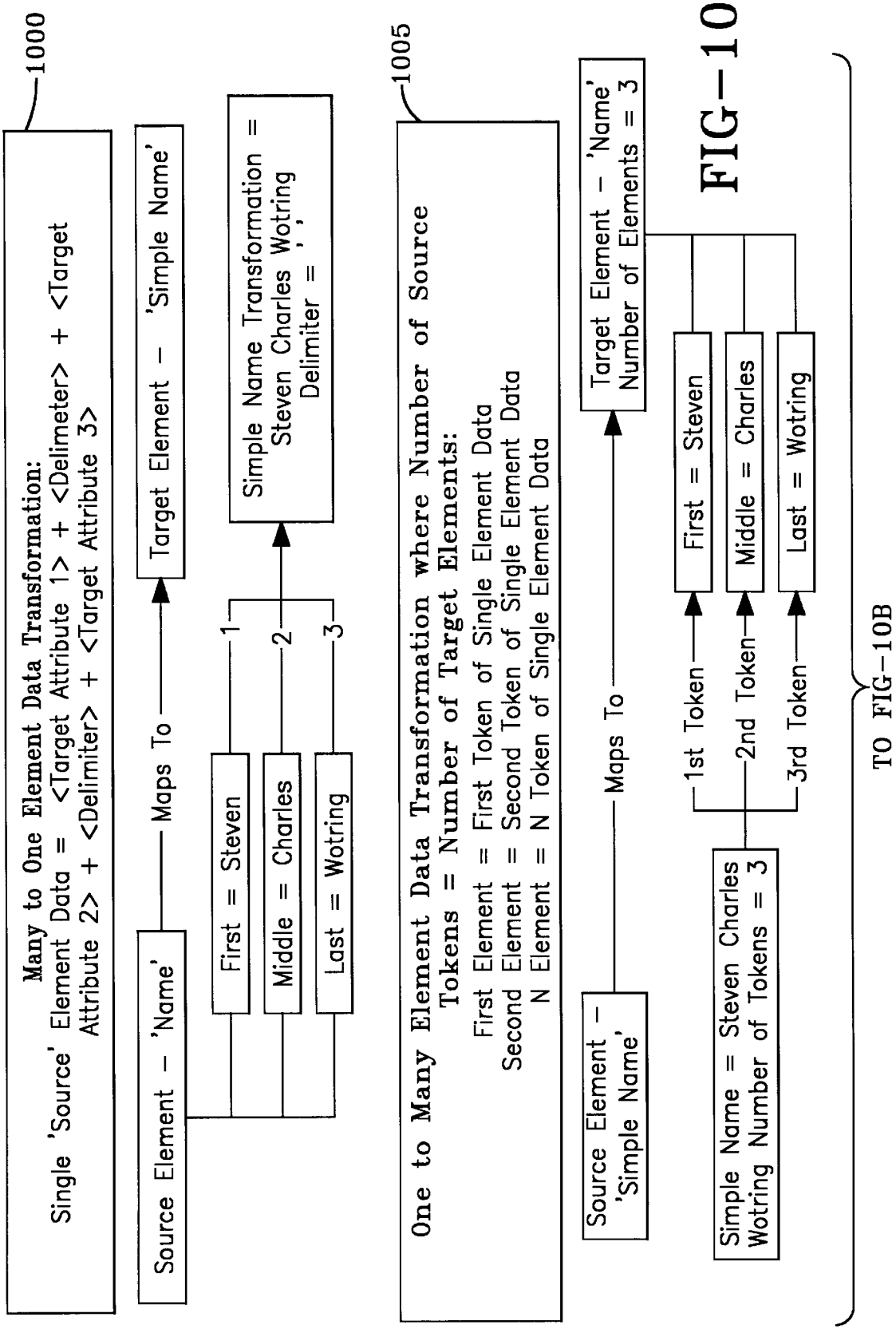
FIG. 10 shows various ways in which heterogeneous hierarchical tree segments may be transformed.
Figure 10B:
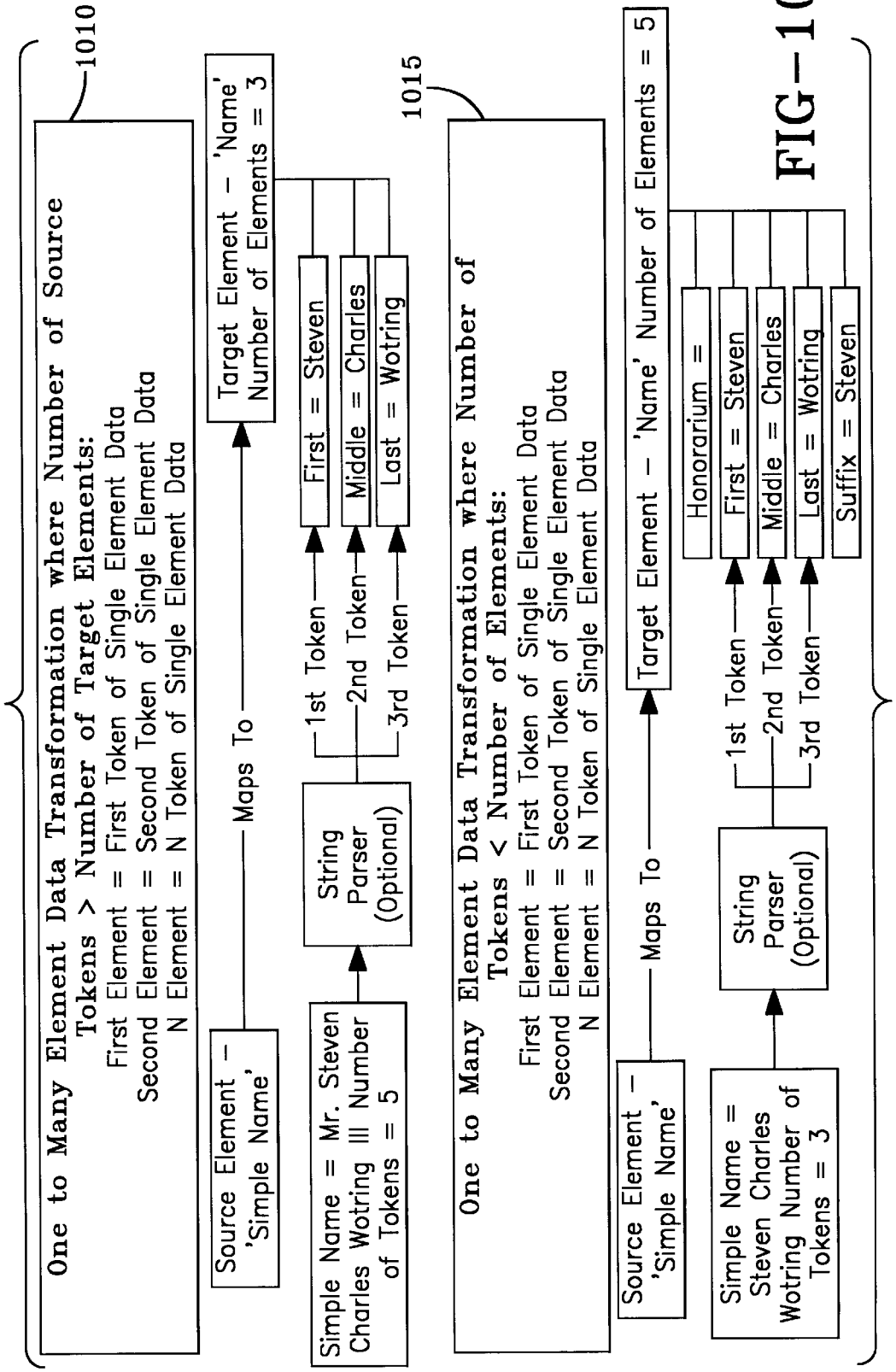
Figure 10C:
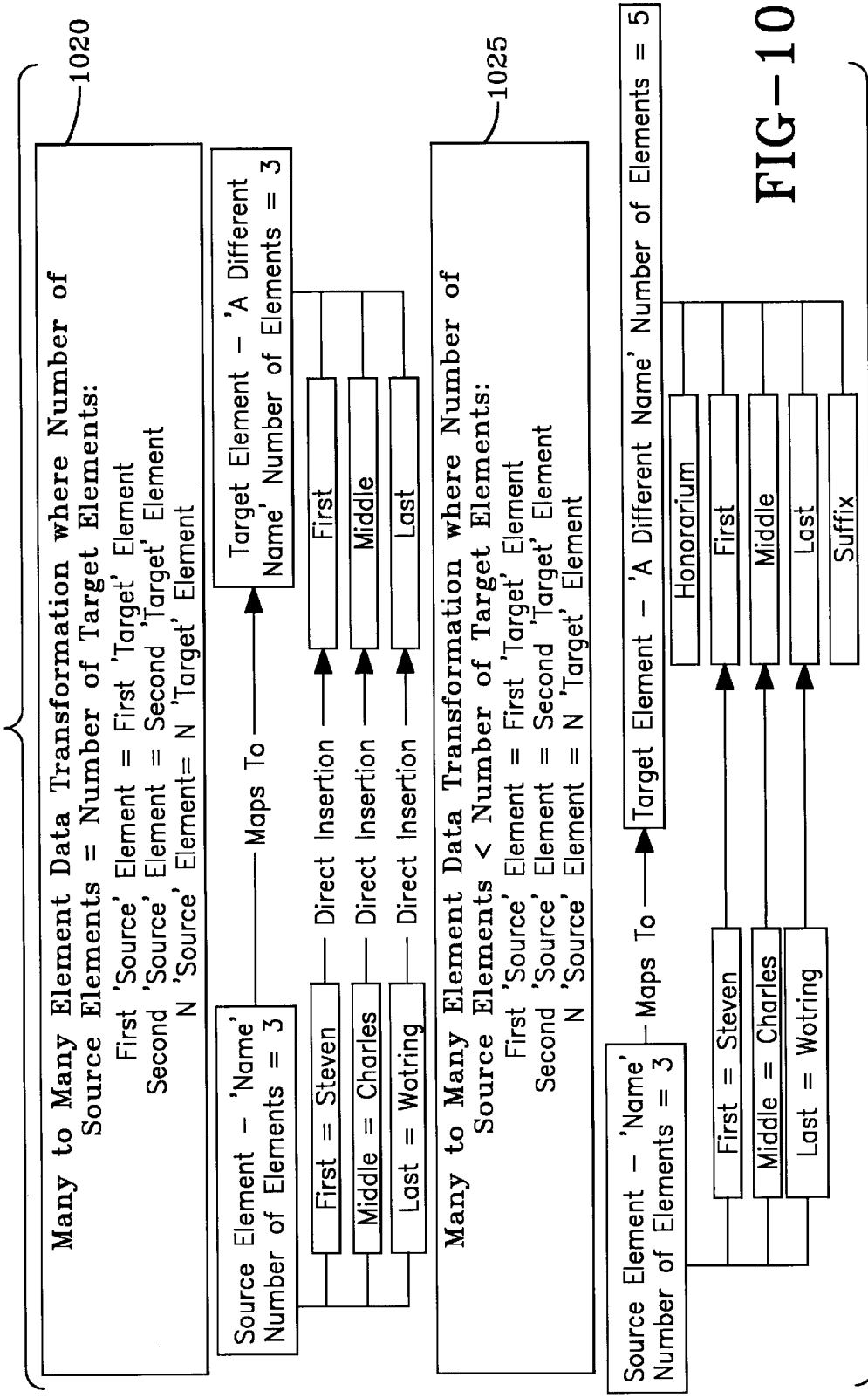
Figure 10D:
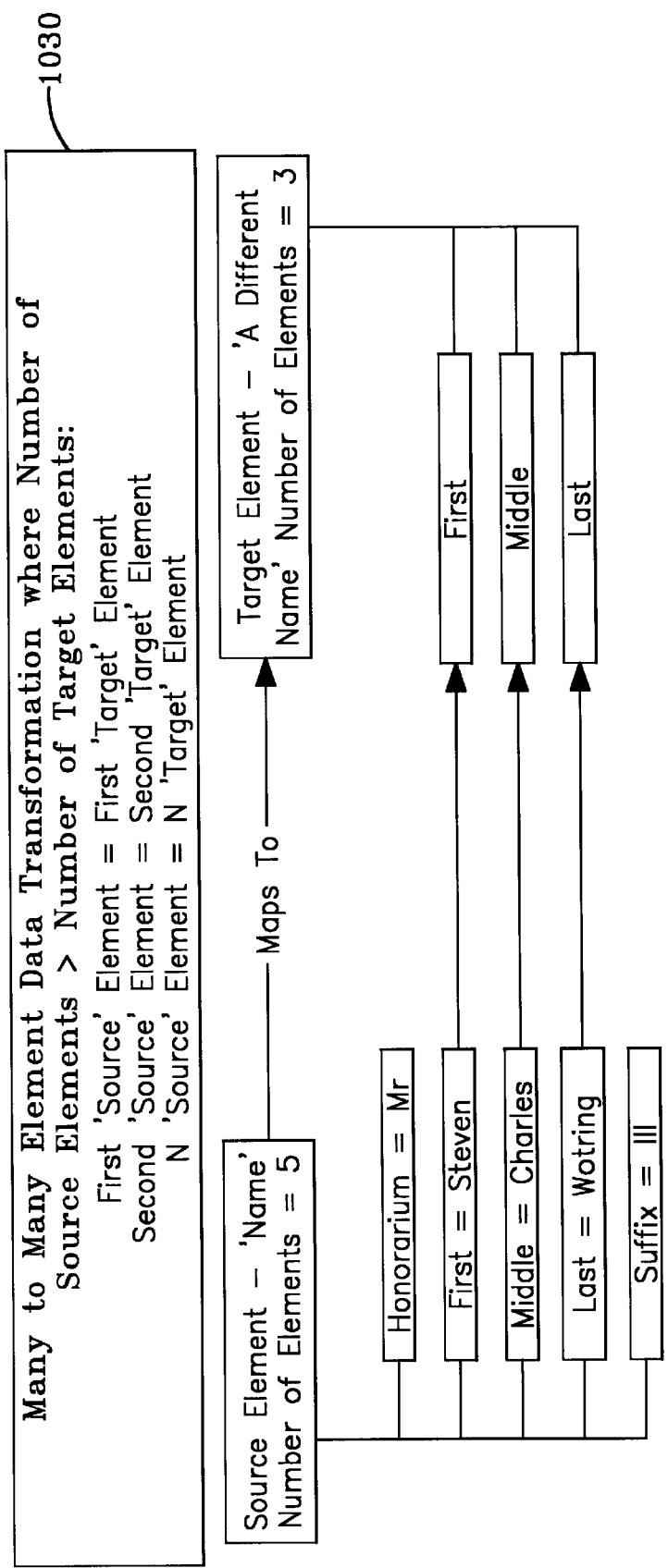

Turning now to FIG. 9, FIG. 9 shows different types of methods 901 for hierarchical tree transformations. In order to compare properties contained within a hierarchical tree structure, specific comparison type methods may be employed. Specifically, a property of tree structure A 905 can be compared to tree structure B 907 by virtue of a collection of comparison type methods such as exact string comparisons, similarity string comparisons, data type lineage and inheritance, similar child structure, and synonym table lookups 901.

An exact string match on a property value, or a property description uses exact string comparisons to compare two hierarchical tree properties alone. Using a similarity string comparison method, two hierarchical tree properties can be compared for similarity. The similarity string comparison method is based on string comparison techniques and determines a percentage similarity score between two property values, represented as string literals from both hierarchical tree structures. Similarity comparison methods may be used to compare two description fields such as 'Social Security Number' and 'Social Security #.' Using similarity comparison methods for the two fields, a percentage score of similarity can be derived using matching characters between the two values divided by the number of characters for field A, plus the number of matching characters between the two values divided by the number of characters in field B, both expressions are then divided by two, and a similarity percentage score is arrived upon.

'Social Security Number' → 'Social Security #'
[((# Matching Characters) / (Total # Characters) for String A) +
    ((# Matching Characters) / (Total # Characters) for String B)] / 2
'Social Security Number' is 78.2% similar to 'Social Security #'

In this example, 'Social Security Number' is 78.2% similar to 'Social Security #' for the method described.

Another method of comparing two tree properties is through data type lineage and inheritance comparison 910. Data lineage and inheritance 910 is the ability to create a set of data types that may derive common properties from a base set of properties. For this example, a data type would actually be a tree property that is shared between the two hierarchical structures. Taking a 'simple name' property 912 and allowing a 'standard name' property 915 to be derived from the original structure display data type lineage and inheritance 910. With the derived 'standard name' property 915, a 'full name' property 920 can be established by adding properties for honorarium 921 and suffix 925. What makes this example interesting is that building a lineage and inheritance structure 910 of data types allows two tree structures to be better compared so that heterogeneous data queries are more precise and reliable. When a data type attribute of 'standard name' 915 in one tree is compared to a data type attribute of full name 920 in another tree, data type lineage and inheritance 910 helps facilitate the comparison of the two data type values. When the 'full name' 920 is compared to the 'standard name' 915, the lineage dictates that 'full name' 920 is derived from 'standard name' 915, and can thus be retrofitted to the existing structure.

While data type lineage and inheritance uses preprogrammed knowledge of relationships within data types, a similar child structure comparison method 930 can be used to compare two tree structures in order to determine if one tree segment is similar to another tree segment in a different tree structure. For example, a 'full name' property 935, not data type, may exist as a tree segment in one tree structure. In another tree structure, a property for 'different name' 940 may exist. Using a similar child structure comparison method 930, a positive or negative similarity comparison determination can be arrived upon for the two structures. The similarity comparison determination may use, but is not limited to, tree segment child total comparisons, property exact string comparisons, property similarity string comparisons, data type lineage and inheritance comparisons, and other associated methods. When the two structures are compared for the using the comparison criteria, a similarity comparison score is returned. Depending on the similarity comparison score returned, the two tree segments compared may, or may not be, mapped, or transformed from one structure to another.

The last hierarchical tree comparison type is what is known as a synonym lookup table comparison method. The synonym method allows a series of translations for literal values to be specified and used in the mapping and transformation process. Using a synonym table, a tree that contains properties that can be translated to another structure can do so by looking up the values in the synonym table in order to locate the best match in a second structure. An example of a synonym table might contain various spellings and abbreviations of the value 'Social Security Number', or 'Phone #'.

SSN=FIN=Social Security Number=Social Security#= Soc. Sec. Num.

Phone#=Phone=Phone Number=Phone Num.

Turning to FIG. 10, FIG. 10 shows various ways in which heterogeneous hierarchical tree segments may be transformed. Heterogeneous element transformations occur when one tree segment is transformed into another secondary tree segment. Depending on the case, tree segments can either be directly transformed when the structures are the same, or the transformation might require an altering of the source structure to the form of the target structure. Heterogeneous element transformations usually occur when one hierarchical structure is transformed into another dissimilar hierarchical structure. Transformations may also occur when data type lineage and inheritance comparison methods are used. Generally, heterogeneous element transformations occur after two hierarchical structures have been mapped and data is in the process of being transformed from one structure to another.

The first heterogeneous element transformation described is a many to one element data transformation 1000. A many to one element transformation 1000 occurs when a source element contains a plurality of fields while the target element contains only one field. In this case, the plurality of fields contained in the tree segment are compounded with a delimiter, and then transformed into the single field.

The second heterogeneous element transformation method is a one to many element transformation where the number of tokens contained in the source field is equal to the number of fields contained within the target tree segment 1005. A token is a part of a larger string value that is separated either by a space or some other delimiter. When the number of tokens is equal to the number of elements that the original source element is to be transformed into, each token is simply inserted into each respective target element. Properties can be used to do an in-order, or reverse order insertion of the elements into the target structure.

The third heterogeneous element transformation method is a one to many element transformation where the number of source element tokens is greater than the number of target elements 1010. In this example, an optional string parser may be used to extract and use the most appropriate values from the source field. For example, a source element may contain a full name value; using a string parser, a special string parser can be used to extract tokens that relate to the values that exist in the target tree segment. For this example, a parser may choose to overlook values that may represent an honorarium or suffix because those properties do not exist in the target structure. Once the optional parser has worked on the fields the set of tokens can then be inserted either in order, or reverse order, into the target tree segment.

The fourth heterogeneous element transformation method is a one to many element transformation where the number of source element tokens is less than the number of target elements 1015. Using an optional string parser, values can be extracted from the source element. When inserting values, the string parser can stub in fake, or empty element values to even the number of source tokens with the number of target elements. The string parser would in turn properly order the elements and perform an in-order, or reverse order insertion of the source tokens to the target tree segment. Another method might be used where a search weighting property of the target field is used. For this method, the tokens are inserted in order from highest search weight to lowest search weight for the number of tokens available. This method often inserts the values into the most important fields in the target tree segment.

The fifth heterogeneous element transformation method is a many to many element transformation where the number of source elements is equal to the number of target elements 1020. This is the most simple heterogeneous element transformation. Each element in the source tree is transformed into the second tree either in order, or in reverse order. The element values in this example are simply transformed from one like structure to another.

The sixth heterogeneous element transformation method is a many to many element transformation where the number of source elements is less than the number of target elements 1025. In this example, only the top weighted target elements are used, up to the number of source elements. At that point, elements from the source are transformed and inserted into the target structure either in order, or in reverse order.

The final heterogeneous transformation method is a many to many transformation where the number of source elements is greater than the number of target elements 1030. In this example, only the top weighted source elements are used, up to the number of target elements. At that point, elements from the source are transformed and inserted into the target structure either in order, or in reverse order.

Figure 11B:
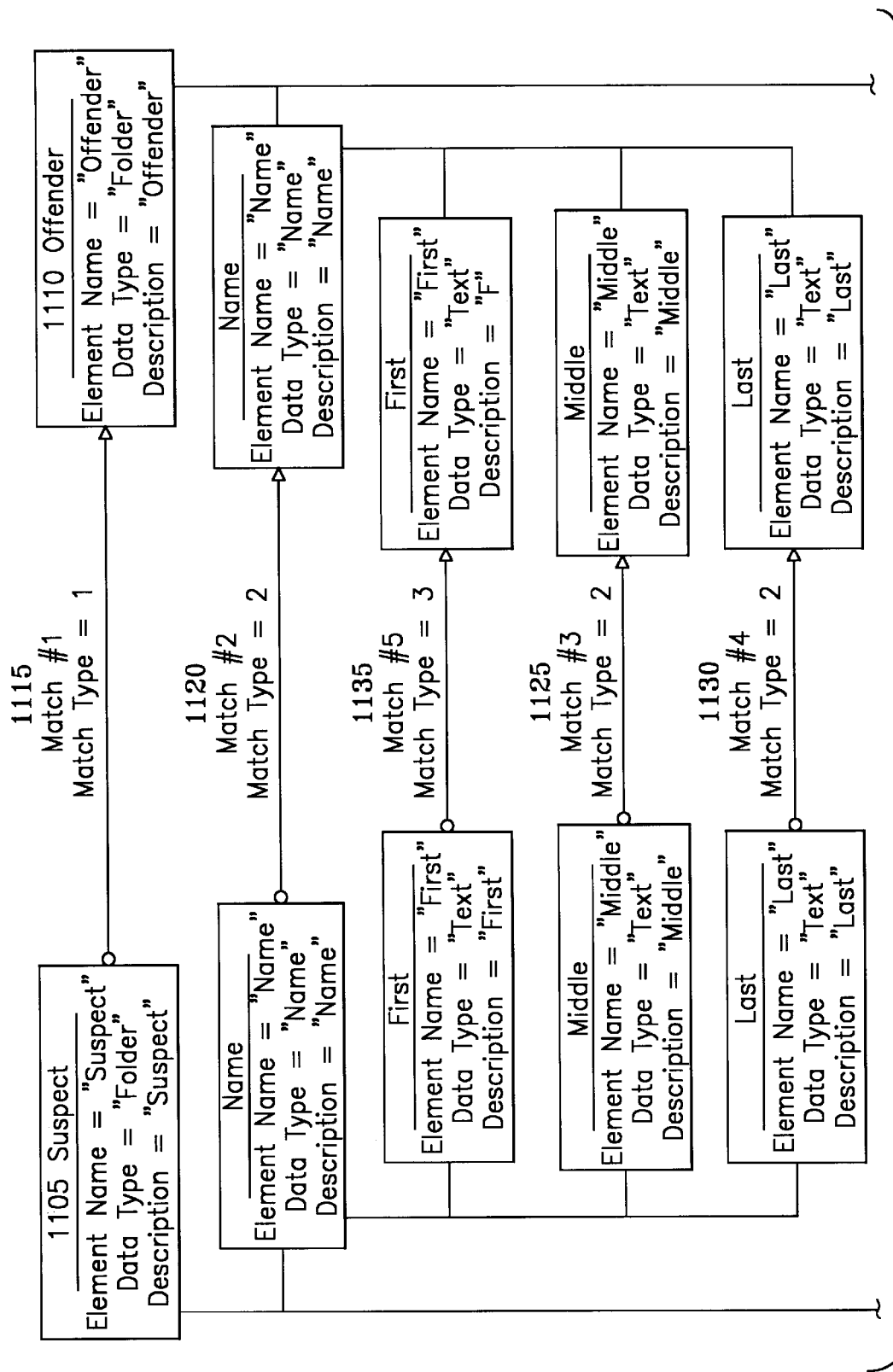
Figure 11D:
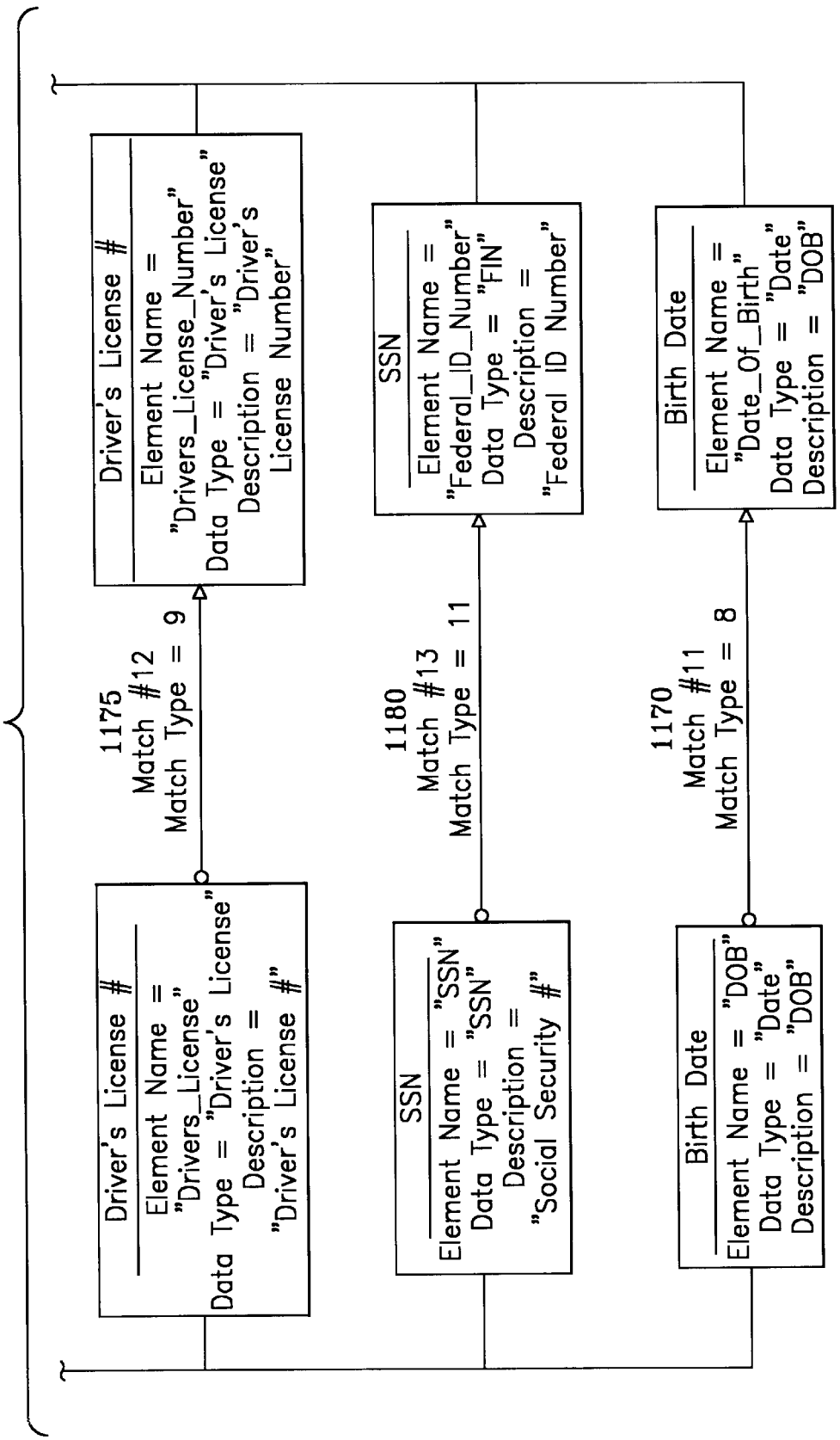

Turning to FIG. 11A–FIG. 11D, FIG. 11A shows an example 1100 of a user ordered strategy list, and FIG. 11B–FIG. 11D illustrate a process of comparing two hierarchical tree structures using the ordered strategy list. A user ordered strategy list 1100 contains a number of permutations of match type and match methods. In this example, there are a total of eighteen strategies that are employed in order to attempt the transformation of one structure into another structure. For each of the specified strategies, an attempt will be made to map and transform one entire hierarchical structure into another hierarchical structure.

There is one 'source' hierarchical structure that represents properties that describe a suspect 1105. The second 'target' hierarchical structure represents properties that describe an offender 1110. The goal of the example is to display how one structure can be mapped to another, allowing a transformation of information that is contained in the source structure into the target structure. This process is achieved through recursively traversing the tree structures and using the user ordered strategy list to compare the two tree segments that are attempting to be mapped together so that information can be transformed from the source structure to the target structure.

First, the suspect tree 1105 is compared to the offender tree 1110 by using the first available strategy 1115. In this case, there is a match between the two structures by virtue of a specified context map from the element 'Suspect' to the element 'Offender'. For the next segment, a match is made between the two name fields for the element name, data type, and description values 1120. Next, a match is then made between the name fields 'Middle', and subsequently 'Last', that are contained in both tree segments 1125, 1130. The match type for these occurrences is again by virtue of same values for element name, data type, and description.

Once all fields are matched for strategy two in the current tree segment, the next strategy argument is then used. For the third strategy, a match is quickly made on the 'First' fields by virtue of an identical data type and element names, and a similar description value 1135. At this point the current segment of both trees has been mapped. Next, we will move back up the tree and onto the next available unmapped item 'Address'. Attempts are made to use strategies one through four, but strategy five finally succeeds 1145. Strategy five entails a match by identical element name, similar data type, and identical description. Next, the method processes the address fields to find the best available matches.

As the method traverses into the address fields, the strategy list is reset, an attempts are made to find a match for each strategy, on each field pair in the current tree segment. The first match occurs when the 'State' fields are matched by strategy two 1150. The next match is then made by strategy five for the 'Street' field 1155. Subsequent matches are made by the same strategy for the 'City' and 'Zip' fields 1160, 1165. Next, the method traverses back up the source tree structure, then locates the next unmatched field and attempts to match up the structure to the target tree by another strategy.

For the segment of fields, a number of strategies are exhausted until one finally succeeds. The field 'Birth Date' matches up to the field in the target tree structure by strategy eight. Strategy eight is a match on similar element name, identical data type, and identical description 1170. The next match is then made on the field 'Driver's License #' to the field 'Driver's License #' by a match for strategy nine. Strategy nine implies a match on similar element name, identical data type, and similar description 1175. Finally, the last match is made between the two segments for the fields 'SSN' in both trees using strategy eleven. Strategy eleven entails a match by similar element name, similar data type, and similar description 1180.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i. e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention.

What is claimed is:

1. A method for matching data contained in a source data structure to data contained in a target data structure, comprising:

selecting a set of one or more comparison methods;

comparing each node of the source data structure with each node in the target data structure using the selected comparison methods;

determining a measure of similarity between each node of the source data structure and each node of the target data structure;

automatically mapping data from a node of the source data structure to a node of the target data structure if the measure of similarity between the source data structure node and the target data structure node exceed a predetermined threshold value; and notifying a user of the mapped data results.

2. The method of claim 1, wherein the one or more comparison methods are selected from the group consisting of exact string match, similarity string comparison, data type lineage and inheritance, similar child structure and synonym table lookup.

3. The method of claim 1, wherein each data node comprises an element name, an element data type attribute, and an attribute description value.

4. The method of claim 1, further comprising a strategy list whereby selected comparison methods are assigned to each data node element name, each data node element attribute value.

5. The method of claim 4, wherein the data node element attribute value is selected form the group consisting of attribute data type value and attribute description value.

6. The method of claim 1, wherein the measure of similarity is based on a percentage value of similarity.

7. The method of claim 1, further comprising manually defining a mapping between selected nodes of the source and target data structures prior to the steps of selecting, comparing, and determining.

8. The method of claim 1, further comprising manually defining a mapping between selected nodes of the source and target data structures after the automatically mapping step.

9. The method of claim 1, wherein the mapping process comprises storing data from the source data structure into the target data structure.

10. The method of claim 1, wherein the mapping process comprises storing indices of mapped data for linking data between the source data structure and the target data structure.

11. The method of claim 1, wherein the automatic mapping step is selected from the group consisting of many to one element data transformation, one to many element data transformation where a number of source tokens equals a number of target elements, one to many element data transformation where a number of source tokens id greater than a number of target elements, one to many element data transformation where a number of source tokens is less than a number of target elements, many to many element data transformation where a number of source elements equals a number of target elements, many to many element data transformation where a number of source elements is less than a number of target elements, and many to many element data transformation where a number of source elements is greater than a number of target elements.

12. The method of claim 1, further comprising submitting and executing a search request in the target data structure based on elements in the source data structure.

13. The method of claim 11, further comprising returning a search result containing data indices and data.

14. The method of claim 1, further comprising representing each node in a data structure in a language selected from the group consisting of HTML, XML, and SGML.

15. The method of claim 1, further comprising selecting another set of comparison methods and recursively repeating the steps of comparing and determining a measure of similarity.

16. A system for matching data contained in a source data structure to data contained in a target data structure, comprising:

a strategy list for selecting a set of one or more comparison methods;

means for comparing each node of the source data structure with each node in the target data structure using the selected comparison methods;

means for determining a measure of similarity between each node of the source data structure and each node of the target data structure;

a search engine component for automatically mapping data from a node of the source data structure to a node in the target data structure if the measure of similarity between the source data structure node and the target data structure node exceed a predetermined threshold value;

indices for designating a mapping between similar nodes of the source and target data structure; and means for notifying a user of the mapped data results.

17. The system of claim 16, wherein a search request from a user application designates the set of one or more comparison methods.

18. The system of claim 16, wherein the means for comparing nodes of the source and target data structure is selected from the group consisting of exact string match, similarity string comparison, data type lineage and inheritance, similar child structure and synonym table lookup.

19. The system of claim 16, wherein each node of the source and target data structures comprises an element name, an element data type attribute and an attribute description value.

20. The system of claim 16, wherein the means for comparing nodes and determining a measure of similarity between nodes of the source and target data structure comprises a search engine component.

21. The system of claim 16, further comprising search index databases for storing the mapping indices.

22. The system of claim 16, further comprising database management systems for storing the target and source databases.

23. The system of claim 16, further comprising a data gateway component for accepting a search request from a user application, issuing search commands to a search engine component and a data management component, and sending a result set to the requesting user application.

24. The system of claim 16, wherein the strategy list comprises a matrix of comparison methods for each data structure node comprising element name, attribute data type value, and attribute description value.

25. The system of claim 16, wherein the mapping comprises source node data being added to target node data.

26. The system of claim 16, further comprising means for enabling a user to manually enter mapping data.

27. A computer-readable media containing instructions for controlling a computer system to implement the method of claim 1.

28. A computer-readable media containing instructions for controlling a computer system to implement the method of claim 15.

* * * * *